(12) United States Patent
Henson et al.

(10) Patent No.: US 11,678,615 B2
(45) Date of Patent: Jun. 20, 2023

(54) METHOD AND SYSTEM FOR DYNAMIC POWER DELIVERY TO A FLEXIBLE GROWCENTER USING UNUTILIZED ENERGY SOURCES

(71) Applicant: LANCIUM LLC, Houston, TX (US)

(72) Inventors: David Henson, Chicago, IL (US); Michael T. McNamara, Chicago, IL (US); Raymond E. Cline, Jr., Chicago, IL (US)

(73) Assignee: LANCIUM LLC, Houston, TX (US)

( * ) Notice: Subject to any disclaimer, the term of this patent is extended or adjusted under 35 U.S.C. 154(b) by 289 days.

(21) Appl. No.: 16/961,386

(22) PCT Filed: Feb. 13, 2018

(86) PCT No.: PCT/US2018/017955
§ 371 (c)(1),
(2) Date: Jul. 10, 2020

(87) PCT Pub. No.: WO2019/139633
PCT Pub. Date: Jul. 18, 2019

(65) Prior Publication Data
US 2020/0359572 A1 Nov. 19, 2020

Related U.S. Application Data

(60) Provisional application No. 62/616,348, filed on Jan. 11, 2018.

(51) Int. Cl.
*A01G 9/24* (2006.01)
*H02J 3/38* (2006.01)
(Continued)

(52) U.S. Cl.
CPC ............... *A01G 9/243* (2013.01); *A01G 9/18* (2013.01); *A01G 9/24* (2013.01); *A01G 9/246* (2013.01);
(Continued)

(58) Field of Classification Search
CPC .......... A01G 9/243; H02J 3/381; H02J 13/00
See application file for complete search history.

(56) References Cited

U.S. PATENT DOCUMENTS

| 1,576,019 A | 3/1926 | Samuel |
| 1,758,567 A | 5/1930 | Fernandez |

(Continued)

FOREIGN PATENT DOCUMENTS

| CN | 101803148 A | 8/2010 |
| CN | 102185382 A | 9/2011 |

(Continued)

OTHER PUBLICATIONS

Advisory Action dated Nov. 13, 2020 for U.S. Appl. No. 16/529,360, filed Aug. 1, 2019, 182 pages.
(Continued)

*Primary Examiner* — Sisay G Tiku
(74) *Attorney, Agent, or Firm* — Barnes & Thornburg LLP

(57) ABSTRACT

A flexible growcenter includes a mobile container, a behind-the-meter power input system, a power distribution system, a growcenter control system, a climate control system, a lighting system, and an irrigation system. The growcenter control system modulates power delivery to one or more components of the climate control system, the lighting system, and the irrigation system based on unutilized behind-the-meter power availability or an operational directive. A method of dynamic power delivery to a flexible growcenter using unutilized behind-the-meter power (Continued)

includes monitoring unutilized behind-the-meter power availability, determining when a growcenter ramp-up condition is met, and enabling behind-the-meter power delivery to one or more computing systems when the growcenter ramp-up condition is met.

32 Claims, 8 Drawing Sheets

(51) Int. Cl.
  *H02J 13/00* (2006.01)
  *G05B 19/042* (2006.01)
  *H02S 40/32* (2014.01)
  *A01G 9/18* (2006.01)
  *A01G 9/26* (2006.01)
  *G06F 1/3203* (2019.01)
  *G06F 9/48* (2006.01)

(52) U.S. Cl.
  CPC ............ *A01G 9/247* (2013.01); *A01G 9/249* (2019.05); *A01G 9/26* (2013.01); *G05B 19/042* (2013.01); *G06F 1/3203* (2013.01); *G06F 9/4856* (2013.01); *H02J 3/38* (2013.01); *H02J 3/381* (2013.01); *H02J 13/00* (2013.01); *H02J 13/00002* (2020.01); *H02J 13/00007* (2020.01); *H02S 40/32* (2014.12); *G05B 2219/2639* (2013.01); *H02J 2300/20* (2020.01); *H02J 2300/24* (2020.01); *H02J 2300/28* (2020.01)

(56) References Cited

U.S. PATENT DOCUMENTS

| | | | |
|---|---|---|---|
| 1,881,965 A | 10/1932 | Moroni et al. |
| 2,065,974 A | 12/1936 | Fritz et al. |
| 2,171,253 A | 8/1939 | Day |
| 2,172,910 A | 9/1939 | Keller |
| 2,203,731 A | 6/1940 | Keller |
| 2,246,513 A | 6/1941 | Hammond |
| 2,319,995 A | 5/1943 | Keller |
| 2,336,178 A | 12/1943 | Keller |
| 2,414,170 A | 1/1947 | Salzmann |
| 2,446,108 A | 7/1948 | Salzmann |
| 2,453,886 A | 11/1948 | Ackeret et al. |
| 2,454,358 A | 11/1948 | Traupel |
| 2,566,817 A | 9/1951 | Yellin |
| 2,689,680 A | 9/1954 | Lovesey |
| 2,697,326 A | 12/1954 | Featonby |
| 2,788,195 A | 4/1957 | Karmazin |
| 2,791,204 A | 5/1957 | Andrus |
| 2,820,348 A | 1/1958 | Sauter |
| 2,860,493 A | 11/1958 | Capps et al. |
| 2,911,792 A | 11/1959 | Herre |
| 3,152,442 A | 10/1964 | Rowekamp |
| 3,220,191 A | 11/1965 | Berchtold |
| 3,285,567 A | 11/1966 | Richardson |
| 3,352,774 A | 11/1967 | Williams |
| 3,537,517 A | 11/1970 | Doyle |
| 3,630,022 A | 12/1971 | Jubb |
| 3,797,516 A | 3/1974 | Forster et al. |
| 3,818,697 A | 6/1974 | Gilli |
| 3,897,170 A | 7/1975 | Darvishian |
| 3,955,359 A | 5/1976 | Yannone et al. |
| 4,024,908 A | 5/1977 | Meckler |
| 4,054,124 A | 10/1977 | Knoos |
| 4,089,744 A | 5/1978 | Cahn |
| 4,094,148 A | 6/1978 | Nelson |
| 4,110,987 A | 9/1978 | Cahn et al. |
| 4,117,682 A | 10/1978 | Smith |
| 4,124,061 A | 11/1978 | Mitchell et al. |
| 4,126,291 A | 11/1978 | Gilbert et al. |
| 4,148,191 A | 4/1979 | Frutschi |
| 4,158,384 A | 6/1979 | Brautigam |
| 4,215,553 A | 8/1980 | Poirier et al. |
| 4,362,290 A | 12/1982 | Marx et al. |
| 4,405,010 A | 9/1983 | Schwartz |
| 4,408,654 A | 10/1983 | Doomernik |
| 4,430,241 A | 2/1984 | Fiorucci |
| 4,438,630 A | 3/1984 | Rowe |
| 4,444,024 A | 4/1984 | McFee |
| 4,479,352 A | 10/1984 | Yamaoka et al. |
| 4,523,629 A | 6/1985 | Copeland |
| 4,566,668 A | 1/1986 | Koppenberg |
| 4,583,372 A | 4/1986 | Egan et al. |
| 4,628,692 A | 12/1986 | Pierce |
| 4,643,212 A | 2/1987 | Rothrock |
| 4,670,205 A | 6/1987 | Montierth |
| 4,715,576 A | 12/1987 | Montierth |
| 4,727,930 A | 3/1988 | Bruckner et al. |
| 5,131,231 A | 7/1992 | Trimble et al. |
| 5,142,672 A | 8/1992 | Johnson et al. |
| 5,160,689 A | 11/1992 | Kamen |
| 5,269,145 A | 12/1993 | Krause et al. |
| 5,367,669 A | 11/1994 | Holland et al. |
| 5,537,822 A | 7/1996 | Shnaid et al. |
| 5,644,928 A | 7/1997 | Uda et al. |
| 5,653,656 A | 8/1997 | Thomas et al. |
| 5,653,670 A | 8/1997 | Endelman |
| 5,913,046 A | 6/1999 | Barth et al. |
| 6,119,682 A | 9/2000 | Hazan |
| 6,288,456 B1 | 9/2001 | Cratty |
| 6,532,745 B1 | 3/2003 | Neary |
| 6,629,413 B1 | 10/2003 | Wendt et al. |
| 6,633,823 B2 | 10/2003 | Bartone et al. |
| 6,634,410 B1 | 10/2003 | Wilson et al. |
| 6,644,062 B1 | 11/2003 | Hays |
| 6,701,711 B1 | 3/2004 | Litwin |
| 6,748,932 B1 | 6/2004 | Sorter et al. |
| 6,749,011 B2 | 6/2004 | Horng et al. |
| 6,785,592 B1 | 8/2004 | Smith et al. |
| 6,787,116 B2 | 9/2004 | Williams et al. |
| 7,028,481 B1 | 4/2006 | Morrow |
| 7,086,231 B2 | 8/2006 | Pinkerton |
| 7,143,300 B2 | 11/2006 | Potter et al. |
| 7,226,554 B2 | 6/2007 | Sudo et al. |
| 7,278,273 B1 | 10/2007 | Whitted et al. |
| 7,299,633 B2 | 11/2007 | Murphy et al. |
| 7,376,851 B2 | 5/2008 | Kim |
| 7,458,418 B2 | 12/2008 | Sienel |
| 7,603,858 B2 | 10/2009 | Bennett |
| 7,647,516 B2 | 1/2010 | Ranganathan et al. |
| 7,702,931 B2 | 4/2010 | Goodrum et al. |
| 7,779,276 B2 | 8/2010 | Bolan et al. |
| 7,861,102 B1 | 12/2010 | Ranganathan et al. |
| 7,921,315 B2 | 4/2011 | Langgood et al. |
| 7,937,930 B1 | 5/2011 | Dunn |
| 7,954,320 B2 | 6/2011 | Ellensohn et al. |
| 7,954,321 B2 | 6/2011 | Shinnar |
| 7,970,561 B2 | 6/2011 | Pfeiffer |
| 8,001,403 B2 | 8/2011 | Hamilton et al. |
| 8,006,108 B2 | 8/2011 | Brey et al. |
| 8,113,011 B2 | 2/2012 | Howes et al. |
| 8,136,358 B1 | 3/2012 | Brostmeyer |
| 8,206,075 B2 | 6/2012 | White et al. |
| 8,214,843 B2 | 7/2012 | Boss et al. |
| 8,260,913 B2 | 9/2012 | Knapp et al. |
| 8,374,928 B2 | 2/2013 | Gopisetty et al. |
| 8,403,613 B2 | 3/2013 | Van Der Meulen |
| 8,424,284 B2 | 4/2013 | Staffend et al. |
| 8,447,993 B2 | 5/2013 | Greene et al. |
| 8,453,677 B2 | 6/2013 | Howes et al. |
| 8,496,026 B2 | 7/2013 | Howes et al. |
| 8,500,388 B2 | 8/2013 | Van Der Meulen et al. |
| 8,571,820 B2 | 10/2013 | Pfeiffer |
| 8,613,195 B2 | 12/2013 | Held et al. |
| 8,627,123 B2 | 1/2014 | Jain et al. |
| 8,639,392 B2 | 1/2014 | Chassin |
| 8,656,712 B2 | 2/2014 | Howes et al. |
| 8,671,686 B2 | 3/2014 | Pinkerton et al. |
| 8,700,929 B1 | 4/2014 | Weber et al. |
| 8,706,915 B2 | 4/2014 | Duchesneau |

(56) References Cited

U.S. PATENT DOCUMENTS

| | | |
|---|---|---|
| 8,719,223 B2 | 5/2014 | Knapp et al. |
| 8,789,061 B2 | 7/2014 | Pavel et al. |
| 8,799,690 B2 | 8/2014 | Dawson et al. |
| 8,826,664 B2 | 9/2014 | Howes et al. |
| 8,833,079 B2 | 9/2014 | Smith |
| 8,833,101 B2 | 9/2014 | Howes et al. |
| 8,839,551 B2* | 9/2014 | Swann .................. A01G 9/14 47/17 |
| 8,863,641 B2 | 10/2014 | Howes |
| 8,904,793 B2 | 12/2014 | Hemrle et al. |
| 8,931,277 B2 | 1/2015 | Peterson et al. |
| 8,991,183 B2 | 3/2015 | Stiesdal |
| 9,003,211 B2 | 4/2015 | Pfeiffer |
| 9,003,216 B2 | 4/2015 | Sankar et al. |
| 9,026,814 B2 | 5/2015 | Aasheim et al. |
| 9,027,024 B2 | 5/2015 | Mick et al. |
| 9,143,392 B2 | 9/2015 | Duchesneau |
| 9,207,993 B2 | 12/2015 | Jain |
| 9,218,035 B2 | 12/2015 | Li et al. |
| 9,243,566 B2 | 1/2016 | Ono et al. |
| 9,252,598 B2 | 2/2016 | Belady et al. |
| 9,282,022 B2 | 3/2016 | Matthews et al. |
| 9,316,121 B2 | 4/2016 | Davidson et al. |
| 9,416,904 B2 | 8/2016 | Belady et al. |
| 9,518,786 B2 | 12/2016 | Howes et al. |
| 9,542,231 B2 | 1/2017 | Khan et al. |
| 9,552,234 B2 | 1/2017 | Boldyrev et al. |
| 9,618,991 B1 | 4/2017 | Clidaras et al. |
| 9,645,596 B1 | 5/2017 | Lee et al. |
| 9,658,004 B2 | 5/2017 | Howes et al. |
| 9,800,052 B2 | 10/2017 | Li et al. |
| 9,932,830 B2 | 4/2018 | Laughlin |
| 9,994,118 B2 | 6/2018 | Williams et al. |
| 10,012,448 B2 | 7/2018 | Laughlin et al. |
| 10,033,210 B2 | 7/2018 | Peterson et al. |
| 10,082,045 B2 | 9/2018 | Larochelle et al. |
| 10,082,104 B2 | 9/2018 | Apte |
| 10,094,219 B2 | 10/2018 | Laughlin |
| 10,221,775 B2 | 3/2019 | Apte et al. |
| 10,233,787 B2 | 3/2019 | Larochelle et al. |
| 10,233,833 B2 | 3/2019 | Apte et al. |
| 10,250,039 B2* | 4/2019 | Wenzel ................. G01R 31/367 |
| 10,288,357 B2 | 5/2019 | Laughlin et al. |
| 10,340,696 B2 | 7/2019 | Paine et al. |
| 10,367,353 B1 | 7/2019 | McNamara et al. |
| 10,367,535 B2 | 7/2019 | Corse et al. |
| 10,436,109 B2 | 10/2019 | Apte et al. |
| 10,444,818 B1* | 10/2019 | McNamara ........... G06F 1/3296 |
| 10,452,127 B1* | 10/2019 | McNamara ............ G06F 1/263 |
| 10,452,532 B2 | 10/2019 | McVay et al. |
| 10,497,072 B2 | 12/2019 | Hooshmand et al. |
| 10,608,433 B1 | 3/2020 | McNamara et al. |
| 10,618,427 B1 | 4/2020 | McNamara et al. |
| 10,637,353 B2 | 4/2020 | Ohyama et al. |
| 10,709,076 B2* | 7/2020 | Pham .................. A01G 9/0297 |
| 10,795,428 B2 | 10/2020 | Walsh |
| 10,822,992 B2 | 11/2020 | Spears |
| 10,857,899 B1 | 12/2020 | McNamara et al. |
| 10,862,307 B2 | 12/2020 | Cavness et al. |
| 10,873,211 B2* | 12/2020 | McNamara ............ H02J 13/00 |
| 10,931,117 B2 | 2/2021 | Shoemaker |
| 11,016,456 B2* | 5/2021 | Henson .................. A01G 9/243 |
| 11,016,458 B2 | 5/2021 | McNamara et al. |
| 11,016,553 B2 | 5/2021 | McNamara et al. |
| 11,025,060 B2* | 6/2021 | McNamara ............... G05F 1/66 |
| 11,031,787 B2 | 6/2021 | McNamara et al. |
| 11,031,813 B2* | 6/2021 | McNamara ....... H02J 13/00007 |
| 11,042,948 B1* | 6/2021 | McNamara ........ G05B 23/0294 |
| 11,128,165 B2* | 9/2021 | McNamara .......... H02J 13/0006 |
| 11,163,280 B2 | 11/2021 | Henson et al. |
| 11,194,150 B2 | 12/2021 | Baba |
| 11,256,320 B2 | 2/2022 | McNamara et al. |
| 11,275,427 B2 | 3/2022 | McNamara et al. |
| 11,397,999 B2 | 7/2022 | McNamara et al. |
| 11,431,195 B2 | 8/2022 | McNamara et al. |
| 11,537,183 B2 | 12/2022 | Lewis et al. |
| 2001/0054449 A1 | 12/2001 | Jones et al. |
| 2002/0158749 A1 | 10/2002 | Ikeda et al. |
| 2003/0037150 A1 | 2/2003 | Nakagawa |
| 2003/0074464 A1 | 4/2003 | Bohrer et al. |
| 2003/0074900 A1 | 4/2003 | McFarland |
| 2003/0131623 A1 | 7/2003 | Suppes |
| 2004/0008010 A1 | 1/2004 | Ebrahim et al. |
| 2004/0042579 A1 | 3/2004 | Bolton et al. |
| 2004/0083731 A1 | 5/2004 | Lasker |
| 2004/0088980 A1 | 5/2004 | Emmel et al. |
| 2004/0099994 A1 | 5/2004 | Brinkhues |
| 2004/0117330 A1 | 6/2004 | Ehlers et al. |
| 2005/0005528 A1* | 1/2005 | Brault .................... A01G 9/246 52/63 |
| 2005/0034128 A1 | 2/2005 | Nagashima et al. |
| 2005/0126171 A1 | 6/2005 | Lasker |
| 2005/0154499 A1 | 7/2005 | Aldridge et al. |
| 2005/0203761 A1 | 9/2005 | Barr et al. |
| 2006/0053792 A1 | 3/2006 | Bourgeois |
| 2006/0059772 A1* | 3/2006 | Brault .................... A01G 9/246 47/17 |
| 2006/0137869 A1 | 6/2006 | Steinhauser |
| 2006/0161765 A1 | 7/2006 | Cromer et al. |
| 2006/0185626 A1 | 8/2006 | Allen et al. |
| 2006/0248886 A1 | 11/2006 | Ma |
| 2006/0253675 A1 | 11/2006 | Johannes Bloks |
| 2007/0067657 A1 | 3/2007 | Ranganathan et al. |
| 2007/0228837 A1* | 10/2007 | Nielsen ................. H02M 7/155 307/82 |
| 2007/0295673 A1 | 12/2007 | Enis et al. |
| 2008/0000151 A1* | 1/2008 | Houweling ............ A01G 9/24 47/17 |
| 2008/0030078 A1 | 2/2008 | Whitted et al. |
| 2008/0094797 A1 | 4/2008 | Coglitore et al. |
| 2008/0121387 A1 | 5/2008 | Taniguchi et al. |
| 2008/0238195 A1* | 10/2008 | Shaver .................. H02H 9/041 307/18 |
| 2009/0012523 A1 | 1/2009 | Ruuttu et al. |
| 2009/0055665 A1 | 2/2009 | Maglione et al. |
| 2009/0070611 A1 | 3/2009 | Bower, III et al. |
| 2009/0078401 A1 | 3/2009 | Cichanowicz |
| 2009/0089595 A1 | 4/2009 | Brey et al. |
| 2009/0126377 A1 | 5/2009 | Shibata et al. |
| 2009/0179429 A1 | 7/2009 | Ellis et al. |
| 2009/0216910 A1 | 8/2009 | Duchesneau |
| 2009/0235097 A1 | 9/2009 | Hamilton et al. |
| 2009/0293502 A1 | 12/2009 | Vandor |
| 2010/0024421 A1 | 2/2010 | Litwin et al. |
| 2010/0058350 A1 | 3/2010 | Boss et al. |
| 2010/0175365 A1 | 7/2010 | Ota |
| 2010/0199694 A1 | 8/2010 | Taras et al. |
| 2010/0211810 A1 | 8/2010 | Zacho |
| 2010/0218500 A1 | 9/2010 | Ruer |
| 2010/0235004 A1 | 9/2010 | Thind |
| 2010/0251712 A1 | 10/2010 | Nakhamkin |
| 2010/0275616 A1 | 11/2010 | Saji et al. |
| 2010/0280675 A1 | 11/2010 | Tate, Jr. et al. |
| 2010/0301062 A1 | 12/2010 | Litwin et al. |
| 2010/0301614 A1 | 12/2010 | Ruer |
| 2010/0305516 A1 | 12/2010 | Xu et al. |
| 2010/0328849 A1 | 12/2010 | Ewing et al. |
| 2010/0333113 A1 | 12/2010 | Johnson et al. |
| 2011/0027066 A1 | 2/2011 | Ono et al. |
| 2011/0036091 A1 | 2/2011 | Waterstripe et al. |
| 2011/0072289 A1 | 3/2011 | Kato |
| 2011/0100010 A1 | 5/2011 | Freund et al. |
| 2011/0100011 A1 | 5/2011 | Staffend |
| 2011/0100213 A1 | 5/2011 | Finkenrath et al. |
| 2011/0100356 A1 | 5/2011 | Bliesner |
| 2011/0100611 A1 | 5/2011 | Ohler et al. |
| 2011/0126539 A1 | 6/2011 | Ramaswamy et al. |
| 2011/0139407 A1 | 6/2011 | Ohler et al. |
| 2011/0146940 A1 | 6/2011 | Golbs et al. |
| 2011/0204655 A1 | 8/2011 | Waibel |
| 2011/0209496 A1 | 9/2011 | Horlyk et al. |
| 2011/0259007 A1 | 10/2011 | Aoyama et al. |
| 2011/0262269 A1 | 10/2011 | Lior |
| 2011/0277471 A1 | 11/2011 | Shinnar |

(56) References Cited

U.S. PATENT DOCUMENTS

| | | |
|---|---|---|
| 2011/0282982 A1 | 11/2011 | Jain |
| 2011/0283700 A1 | 11/2011 | Zohar et al. |
| 2011/0289941 A1 | 12/2011 | Gonzalez Salazar et al. |
| 2011/0314839 A1 | 12/2011 | Brook et al. |
| 2011/0316337 A1 | 12/2011 | Pelio et al. |
| 2012/0000121 A1* | 1/2012 | Swann ............... A01G 9/14 47/17 |
| 2012/0017622 A1 | 1/2012 | Kondo et al. |
| 2012/0032665 A1* | 2/2012 | Shaver, II ............ H02H 9/041 323/318 |
| 2012/0039701 A1 | 2/2012 | Diddi et al. |
| 2012/0055661 A1 | 3/2012 | Feher |
| 2012/0060501 A1 | 3/2012 | Hemrle et al. |
| 2012/0072745 A1 | 3/2012 | Ahluwalia et al. |
| 2012/0080161 A1 | 4/2012 | Kelly |
| 2012/0109705 A1 | 5/2012 | Belady et al. |
| 2012/0137684 A1 | 6/2012 | Yogev et al. |
| 2012/0222423 A1 | 9/2012 | Mercangoez et al. |
| 2012/0267955 A1 | 10/2012 | Zhan et al. |
| 2012/0300524 A1 | 11/2012 | Fornage et al. |
| 2012/0306271 A1 | 12/2012 | Kuriyama |
| 2012/0308364 A1 | 12/2012 | Hofmann |
| 2012/0319410 A1 | 12/2012 | Ambrosek et al. |
| 2012/0321309 A1 | 12/2012 | Barry et al. |
| 2012/0326511 A1 | 12/2012 | Johnson |
| 2013/0006401 A1 | 1/2013 | Shan |
| 2013/0007515 A1 | 1/2013 | Shaw et al. |
| 2013/0033044 A1 | 2/2013 | Wright et al. |
| 2013/0054987 A1 | 2/2013 | Pfeiffer et al. |
| 2013/0063991 A1 | 3/2013 | Xiao et al. |
| 2013/0105127 A1 | 5/2013 | Postma et al. |
| 2013/0111494 A1 | 5/2013 | Hyser et al. |
| 2013/0117621 A1 | 5/2013 | Saraiya et al. |
| 2013/0118344 A1 | 5/2013 | Howes et al. |
| 2013/0125546 A1 | 5/2013 | Barmeier et al. |
| 2013/0147197 A1 | 6/2013 | Goebel et al. |
| 2013/0187464 A1 | 7/2013 | Smith et al. |
| 2013/0197704 A1 | 8/2013 | Pan et al. |
| 2013/0227139 A1 | 8/2013 | Suffling |
| 2013/0257056 A1 | 10/2013 | Ma |
| 2013/0266424 A1 | 10/2013 | Soehner |
| 2013/0276917 A1 | 10/2013 | Howes et al. |
| 2013/0318969 A1 | 12/2013 | Zhou et al. |
| 2013/0328395 A1 | 12/2013 | Krizman et al. |
| 2014/0008033 A1 | 1/2014 | Howes et al. |
| 2014/0014302 A1 | 1/2014 | Gutai |
| 2014/0060051 A1 | 3/2014 | Ohler et al. |
| 2014/0070756 A1 | 3/2014 | Kearns et al. |
| 2014/0075970 A1 | 3/2014 | Benson |
| 2014/0137468 A1 | 5/2014 | Ching |
| 2014/0150336 A1* | 6/2014 | Houweling ............ A01G 9/24 47/17 |
| 2014/0165572 A1 | 6/2014 | Pang et al. |
| 2014/0180886 A1 | 6/2014 | Forbes, Jr. |
| 2014/0190659 A1 | 7/2014 | Laurberg |
| 2014/0224447 A1 | 8/2014 | Reznik et al. |
| 2014/0365402 A1 | 12/2014 | Belady et al. |
| 2014/0379156 A1 | 12/2014 | Kamel et al. |
| 2015/0012113 A1 | 1/2015 | Celebi |
| 2015/0034188 A1 | 2/2015 | Howes |
| 2015/0069758 A1 | 3/2015 | Davidson et al. |
| 2015/0084567 A1 | 3/2015 | Howes |
| 2015/0113940 A1 | 4/2015 | Sinatov et al. |
| 2015/0114217 A1 | 4/2015 | Howes |
| 2015/0114591 A1 | 4/2015 | Howes et al. |
| 2015/0121113 A1 | 4/2015 | Ramamurthy et al. |
| 2015/0136115 A1 | 5/2015 | Bruch et al. |
| 2015/0155712 A1 | 6/2015 | Mondal |
| 2015/0167648 A1 | 6/2015 | Bergan |
| 2015/0211386 A1 | 7/2015 | Howes et al. |
| 2015/0212122 A1 | 7/2015 | Sobotka et al. |
| 2015/0229227 A1 | 8/2015 | Aeloiza et al. |
| 2015/0267612 A1 | 9/2015 | Bannari |
| 2015/0277410 A1 | 10/2015 | Gupta et al. |
| 2015/0278968 A1 | 10/2015 | Steven et al. |
| 2015/0278969 A1 | 10/2015 | Benoy et al. |
| 2015/0280492 A1 | 10/2015 | Narita |
| 2015/0288183 A1 | 10/2015 | Villanueva, Jr. et al. |
| 2015/0361832 A1 | 12/2015 | Franke et al. |
| 2015/0372538 A1 | 12/2015 | Siegler et al. |
| 2016/0006066 A1 | 1/2016 | Robertson |
| 2016/0011617 A1 | 1/2016 | Liu et al. |
| 2016/0013652 A1 | 1/2016 | Li et al. |
| 2016/0018134 A1 | 1/2016 | Ueda et al. |
| 2016/0030856 A1 | 2/2016 | Kaplan et al. |
| 2016/0032783 A1 | 2/2016 | Howes et al. |
| 2016/0043552 A1 | 2/2016 | Villanueva, Jr. et al. |
| 2016/0047361 A1 | 2/2016 | Al-Sulaiman |
| 2016/0087909 A1 | 3/2016 | Chatterjee et al. |
| 2016/0109916 A1 | 4/2016 | Li et al. |
| 2016/0126783 A1 | 5/2016 | Cheng et al. |
| 2016/0170469 A1 | 6/2016 | Sehgal et al. |
| 2016/0172900 A1 | 6/2016 | Welch, Jr. |
| 2016/0187906 A1 | 6/2016 | Bodas et al. |
| 2016/0198656 A1 | 7/2016 | McNamara et al. |
| 2016/0202744 A1 | 7/2016 | Castro-Leon |
| 2016/0212954 A1* | 7/2016 | Argento ................ A01G 31/06 |
| 2016/0248299 A1 | 8/2016 | Ouvry |
| 2016/0248631 A1 | 8/2016 | Duchesneau |
| 2016/0261226 A1* | 9/2016 | Hamilton ................ H02J 7/35 |
| 2016/0290281 A1 | 10/2016 | Schmalz |
| 2016/0324077 A1 | 11/2016 | Frantzen et al. |
| 2016/0377306 A1* | 12/2016 | Drees ...................... F24F 11/58 700/295 |
| 2017/0023969 A1 | 1/2017 | Shows et al. |
| 2017/0104332 A1* | 4/2017 | Wenzel ............... G01R 31/367 |
| 2017/0104336 A1 | 4/2017 | Elbsat et al. |
| 2017/0104337 A1* | 4/2017 | Drees .................... H02S 40/32 |
| 2017/0104342 A1* | 4/2017 | ElBsat .................... H02J 3/38 |
| 2017/0104343 A1* | 4/2017 | ElBsat .................... H02J 3/381 |
| 2017/0159495 A1 | 6/2017 | Laughlin et al. |
| 2017/0159496 A1 | 6/2017 | Laughlin et al. |
| 2017/0159497 A1 | 6/2017 | Laughlin et al. |
| 2017/0159498 A1 | 6/2017 | Laughlin et al. |
| 2017/0159500 A1 | 6/2017 | Laughlin et al. |
| 2017/0192483 A1 | 7/2017 | Boss et al. |
| 2017/0194791 A1 | 7/2017 | Budde |
| 2017/0201098 A1* | 7/2017 | Carpenter ............... H02J 3/381 |
| 2017/0214070 A1 | 7/2017 | Wang et al. |
| 2017/0237261 A1* | 8/2017 | Maug .................... H02J 3/381 307/52 |
| 2017/0261949 A1 | 9/2017 | Hoffmann et al. |
| 2017/0321967 A1 | 11/2017 | Laughlin et al. |
| 2017/0350658 A1 | 12/2017 | Kerth et al. |
| 2017/0373500 A1 | 12/2017 | Shafi et al. |
| 2018/0026478 A1 | 1/2018 | Peloso |
| 2018/0052431 A1 | 2/2018 | Shaikh et al. |
| 2018/0116070 A1 | 4/2018 | Broadbent et al. |
| 2018/0144414 A1 | 5/2018 | Lee et al. |
| 2018/0175666 A1 | 6/2018 | Ayer et al. |
| 2018/0179917 A1 | 6/2018 | Apte et al. |
| 2018/0179955 A1 | 6/2018 | Apte et al. |
| 2018/0180363 A1 | 6/2018 | Apte et al. |
| 2018/0185942 A1 | 7/2018 | Apte et al. |
| 2018/0187572 A1 | 7/2018 | Apte |
| 2018/0187595 A1 | 7/2018 | Apte et al. |
| 2018/0187597 A1 | 7/2018 | Apte et al. |
| 2018/0187627 A1 | 7/2018 | Apte et al. |
| 2018/0202825 A1 | 7/2018 | You et al. |
| 2018/0240112 A1 | 8/2018 | Castinado et al. |
| 2018/0267839 A1 | 9/2018 | Maisuria et al. |
| 2018/0294649 A1 | 10/2018 | Bright et al. |
| 2018/0366978 A1 | 12/2018 | Matan et al. |
| 2018/0367320 A1 | 12/2018 | Montalvo |
| 2019/0003308 A1 | 1/2019 | Laughlin |
| 2019/0030593 A1 | 1/2019 | Merrill et al. |
| 2019/0052094 A1 | 2/2019 | Pmsvvsv et al. |
| 2019/0082618 A1* | 3/2019 | Lopez ..................... A01G 9/16 |
| 2019/0162082 A1 | 5/2019 | Larochelle et al. |
| 2019/0162116 A1 | 5/2019 | Apte et al. |
| 2019/0162122 A1 | 5/2019 | Apte et al. |
| 2019/0168630 A1 | 6/2019 | Mrlik et al. |
| 2019/0173283 A1 | 6/2019 | Epel et al. |
| 2019/0195571 A1 | 6/2019 | Laughlin et al. |

(56) References Cited

U.S. PATENT DOCUMENTS

| | | |
|---|---|---|
| 2019/0212070 A1 | 7/2019 | Laughlin et al. |
| 2019/0258307 A1 | 8/2019 | Shaikh et al. |
| 2019/0261589 A1* | 8/2019 | Pham ............... A01G 9/027 |
| 2019/0280521 A1 | 9/2019 | Lundstrom et al. |
| 2019/0318327 A1 | 10/2019 | Sowell et al. |
| 2019/0324820 A1 | 10/2019 | Krishnan et al. |
| 2019/0339756 A1 | 11/2019 | Lewis et al. |
| 2019/0354076 A1 | 11/2019 | Henson et al. |
| 2020/0040272 A1 | 2/2020 | Cavness et al. |
| 2020/0051184 A1 | 2/2020 | Barbour |
| 2020/0073466 A1 | 3/2020 | Walsh |
| 2020/0089307 A1 | 3/2020 | McNamara et al. |
| 2020/0091717 A1 | 3/2020 | McNamara et al. |
| 2020/0091727 A1 | 3/2020 | McNamara et al. |
| 2020/0091766 A1 | 3/2020 | McNamara et al. |
| 2020/0136387 A1 | 4/2020 | McNamara et al. |
| 2020/0136388 A1 | 4/2020 | McNamara et al. |
| 2020/0167197 A1 | 5/2020 | Bahramshahry et al. |
| 2020/0177100 A1* | 6/2020 | Wang ............... H02M 7/5387 |
| 2020/0318843 A1* | 10/2020 | Wenzel ............... F24F 11/46 |
| 2020/0321776 A1* | 10/2020 | Shaver, II ......... H01L 31/0202 |
| 2020/0379537 A1 | 12/2020 | Henson et al. |
| 2021/0021135 A1* | 1/2021 | ElBsat ............... H02J 3/381 |
| 2021/0035242 A1* | 2/2021 | McNamara ........... G06F 1/3203 |
| 2021/0036547 A1* | 2/2021 | McNamara ....... H02J 13/00002 |
| 2021/0101499 A1* | 4/2021 | McNamara ............. B60L 53/53 |
| 2021/0124322 A1* | 4/2021 | McNamara ....... H02J 13/00002 |
| 2021/0126456 A1* | 4/2021 | McNamara ............... G06F 1/20 |
| 2021/0175710 A1 | 6/2021 | Campbell et al. |
| 2021/0287309 A1 | 9/2021 | Gebhardt et al. |
| 2021/0294405 A1* | 9/2021 | McNamara ........... G06F 1/3296 |
| 2021/0296893 A1 | 9/2021 | Mcnamara et al. |
| 2021/0296928 A1 | 9/2021 | Mcnamara et al. |
| 2021/0298195 A1 | 9/2021 | Barbour |
| 2021/0312574 A1* | 10/2021 | McNamara ........ G05B 23/0294 |
| 2022/0033517 A1* | 2/2022 | Hendry ............ A61K 39/39541 |
| 2022/0039333 A1* | 2/2022 | Avila ....................... A01G 9/14 |
| 2022/0197363 A1 | 6/2022 | Mcnamara et al. |
| 2022/0294219 A1 | 9/2022 | Mcnamara et al. |
| 2022/0366517 A1* | 11/2022 | McNamara ............... G06F 1/26 |
| 2022/0407350 A1 | 12/2022 | McNamara et al. |

FOREIGN PATENT DOCUMENTS

| | | |
|---|---|---|
| CN | 102591921 A | 7/2012 |
| CN | 103163904 A | 6/2013 |
| CN | 103748757 A | 4/2014 |
| CN | 104144183 A | 11/2014 |
| CN | 104969434 A | 10/2015 |
| CN | 106226718 A | 12/2016 |
| CN | 107967536 A | 4/2018 |
| DE | 2904232 A1 | 12/1980 |
| DE | 2928691 A1 | 2/1981 |
| DE | 3118101 A1 | 2/1983 |
| DE | 202013004654 U1 | 8/2014 |
| EP | 0003980 A1 | 9/1979 |
| EP | 1577548 A1 | 9/2005 |
| EP | 1857614 A2 | 11/2007 |
| EP | 2241737 A1 | 10/2010 |
| EP | 2275649 A1 | 1/2011 |
| EP | 2312129 A1 | 4/2011 |
| EP | 2390473 A1 | 11/2011 |
| EP | 2400120 A1 | 12/2011 |
| EP | 2441925 A1 | 4/2012 |
| EP | 2441926 A1 | 4/2012 |
| EP | 2532843 A1 | 12/2012 |
| EP | 2905432 B1 | 4/2018 |
| EP | 3850462 A1 | 7/2021 |
| GB | 2501795 A | 11/2013 |
| JP | H03286103 A | 12/1991 |
| JP | H0868341 A | 3/1996 |
| JP | H0893633 A | 4/1996 |
| JP | 2000154733 A | 6/2000 |
| JP | 2011106755 A | 6/2011 |
| KR | 20040045337 A | 6/2004 |
| KR | 20090012523 A | 2/2009 |
| KR | 20120042921 A | 5/2012 |
| KR | 101370843 B1 | 3/2014 |
| KR | 20150089110 A | 8/2015 |
| RU | 2012104762 A | 8/2013 |
| WO | WO-2005019756 A2 | 3/2005 |
| WO | WO-2008039773 A2 | 4/2008 |
| WO | WO-2010024691 A2 | 3/2010 |
| WO | WO-2011099891 A1 | 8/2011 |
| WO | WO-2011161094 A2 | 12/2011 |
| WO | WO-2013037658 A1 | 3/2013 |
| WO | WO-2013045388 A1 | 4/2013 |
| WO | WO-2013094905 A1 | 6/2013 |
| WO | WO-2013119145 A2 | 8/2013 |
| WO | WO-2013164563 A1 | 11/2013 |
| WO | WO-2013164653 A1 | 11/2013 |
| WO | WO-2014005156 A2 * | 1/2014 ............. A01G 31/06 |
| WO | WO-2014027093 A1 | 2/2014 |
| WO | WO-2014052927 A1 | 4/2014 |
| WO | WO-2014114531 A1 | 7/2014 |
| WO | WO-2015039122 A1 | 3/2015 |
| WO | WO-2015185891 A1 | 12/2015 |
| WO | WO-2015199629 A1 | 12/2015 |
| WO | WO-2016000016 A1 | 1/2016 |
| WO | WO-2017163126 A1 * | 9/2017 ................ H02J 1/12 |
| WO | WO-2018068042 A1 * | 4/2018 ............. A01G 31/02 |
| WO | WO-2018125511 A2 | 7/2018 |
| WO | WO2019/060180 | 3/2019 |
| WO | WO-2019116375 A1 | 6/2019 |
| WO | WO-2019139632 A1 * | 7/2019 ............... A01G 9/18 |
| WO | WO-2019139633 A1 * | 7/2019 ............. A01G 31/06 |
| WO | WO-2020056322 A1 | 3/2020 |
| WO | WO-2020227811 A1 | 11/2020 |
| WO | WO-2022031836 A1 * | 2/2022 ........... A01G 9/1423 |

OTHER PUBLICATIONS

Advisory Action dated Oct. 22, 2020 for U.S. Appl. No. 16/528,348, filed Jul. 31, 2019, 3 pages.

Bakar et al., "Microgrid and Load Shedding Scheme During Islanded Mode: a Review," Elsevier, May 26, 2020, vol. 71, pp. 161-169. https://www.sciencedirect.com/science/article/pii/S1364032116311030.

Bird et al., "Wind and Solar Energy Curtailment: Experience and Practices in the United States," National Renewable Energy Lab (NREL), Technical Report NREL/TP-6A20-60983, Mar. 2014, 58 pages.

Choi et al., "Optimal Load Shedding for Maximizing Satisfaction in an Islanded Microgrid," Energies, 2017, vol. 10, pp. 45. doi: 10.3390/en10010045.

EPEX Spot, "How They Occur, What They Mean," 2018, 2 pages. Retrieved from Internet:[URL:https://www.epexspot.com/en/company-info/basics_of_the_power_market/negative_prices].

European Patent Application No. EP18900411.2, Partial Supplementary European Search Report dated Sep. 9, 2021.

Final Office Action dated Jul. 23, 2020 on for U.S. Appl. No. 16/132,062, filed Sep. 14, 2018, 26 pages.

Final Office Action dated May 19, 2020 for U.S. Appl. No. 16/809,111, filed Mar. 4, 2020, 36 pages.

Final Office Action dated Jun. 3, 2020 for U.S. Appl. No. 16/528,348, filed Jul. 31, 2019, 33 pages.

Final Office Action dated May 28, 2020 for U.S. Appl. No. 16/132,098, filed Sep. 14, 2018, 24 pages.

Final Office Action dated Aug. 9, 2021 on for U.S. Appl. No. 16/529,402, filed Aug. 1, 2019, 43 pages.

Final Office Action dated Aug. 9, 2021 on for U.S. Appl. No. 16/573,577, filed Sep. 17, 2019, 16 pages.

Final Office Action dated Jul. 9, 2021 on for U.S. Appl. No. 16/525,142, filed Jul. 29, 2019, 18 pages.

Final Office Action dated Oct. 1, 2019 for U.S. Appl. No. 16/175,246, filed Oct. 30, 2018, 18 pages.

Final Office Action dated Apr. 17, 2020 for U.S. Appl. No. 16/529,402, filed Aug. 1, 2019, 59 pages.

Final Office Action dated Jul. 29, 2020 for U.S. Appl. No. 16/132,092, filed Sep. 14, 2018, 5 pages.

(56) References Cited

OTHER PUBLICATIONS

Gao et al., "Dynamic Load Shedding for an Islanded Microgrid With Limited Generation Resources," IET Generation, Transmission & Distribution, Sep. 2016, vol. 10(12), pp. 2953-2961. doi: 10.1049/iet-gtd.2015.1452.

Ghamkhari et al., "Optimal Integration of Renewable Energy Resources in Data Centers with Behind-the-Meter Renewable Generator," Department of Electrical and Computer Engineering Texas Tech University, 2012, pp. 3340-3444.

Ghatikar et al., "Demand Response Opportunities and Enabling Technologies for DataCenters: Findings from Field Studies," Lawrence Berkeley National Laboratory, Aug. 2012, 57 pages.

Hayes, Adam S., "A Cost of Production Model for Bitcoin," Department of Economics, The New School for Social Research, Mar. 2015, 5 pages.

International Search Report and Written Opinion of PCT Application No. PCT/US2018/017955, dated Apr. 30, 2018, 22 pages. <iframe class="ginger-extension-definitionpopup" src="chrome-extension://kdfieneakcjfaiglcfcgkidlkmlijjnh/content/popups/definitionPopup/index.html?title=filed&description=record%20in%20a%20public%20office%20or%20in%20a%20court%20of%20law" style="left: 396px; top: -116px; z-index: 100001; display: none;"></iframe>.

International Search Report and Written Opinion of PCT Application No. PCT/US2018/017950, dated May 31, 2018, 15 pages.

International Search Report and Written Opinion of PCT Application No. PCT/US2020/044536, dated Aug. 26, 2020, 24 pages.

International Search Report and Written Opinion of PCT Application No. PCT/US2020/044539, dated Aug. 26, 2020, 7 pages.

International Search Report and Written Opinion of PCT Application No. PCT/US2021/019875, dated Apr. 29, 2021, 12 pages.

International Search Report and Written Opinion of PCT Application No. PCT/US20/57686, dated Feb. 22, 2021, 67 pages.

ISO, "Distributed Energy Resources Roadmap for New York's Wholesale Electricity Markets," Distributed Energy Resource Roadmap, Jan. 2017, pp. 1-39. [retrieved on Dec. 15, 2020], Retrieved from the Internet: <url: <a="" href="https://www.nyiso.com/documents/20142/1391862/Distributed_Energy_Resources_Roadmap.pdf/ec0b3b64-4de2-73e0-ffef-49a4b8b1">https://www.nyiso.com/documents/20142/1391862/Distributed_Energy_Resources_Roadmap.pdf/ec0b3b64-4de2-73e0-ffef-49a4b8b1 b3ca.</url:>.

John, "Stem and CPower to Combine Behind-the-Meter Batteries and Demand Response," Energy Storage, Aug. 8, 2017, 5 pages.

Kewl, "Start-Up From the Heart of Berlin Has Pioneered Decentralized Mobile Mining by Combining Blockchain With Regenerative Energy" Nov. 13, 2017, 3 pages. Retrieved from Internet:[URL:www.crypto-news.net/start-up-from-the-heart-of-berlin-has-pioneered-decentralized-mobile-mining-by-combining-blockchain-with-regenerative-energy/].

Lim et al., "Distributed Load-shedding System for Agent-based Autonomous Microgrid Operations," Energies, 2014, vol. 7(1), pp. 385-401. doi: 10.3390/en7010385.

Liu et al., "Improved Average Consensus Algorithm Based Distributed Cost Optimization for Loading Shedding of Autonomous Microgrids," International Journal of Electrical Power & Energy Systems, Dec. 2015, vol. 73, pp. 89-96. doi: 10.1016/j.ijepes.2015.04.006.

McNamara et al., U.S. Appl. No. 16/175,246, mailed on Oct. 30, 2018, 64 pages.

Mousavizadeh et al., "A Linear Two-stage Method for Resiliency Analysis in Distribution Systems Considering Renewable Energy and Demand Response Resources," Elsevier, 2017, pp. 443-460. doi: 10.1016/j.apenergy.2017.11.067.

Non-Final Office Action dated Dec. 5, 2019 for U.S. Appl. No. 16/529,360, filed Aug. 1, 2019, 72 pages.

Non-Final Office Action dated Dec. 10, 2019 for U.S. Appl. No. 16/596,190, filed Oct. 8, 2019, 72 pages.

Non-Final Office Action dated Jun. 12, 2020 for U.S. Appl. No. 16/803,109, filed Dec. 27, 2020, 31 pages.

Non-Final Office Action dated Nov. 14, 2019 for U.S. Appl. No. 16/132,098, filed Sep. 14, 2018, 25 pages.

Non-Final Office Action dated Feb. 20, 2020 for U.S. Appl. No. 16/702,894, filed Dec. 4, 2019, 30 pages.

Non-Final Office Action dated Nov. 21, 2019 for U.S. Appl. No. 16/529,402, filed Aug. 1, 2019, 57 pages.

Non-Final Office Action dated Feb. 4, 2021 on for U.S. Appl. No. 16/284,610, filed Feb. 25, 2019, 9 pages.

Non-Final Office Action dated Apr. 1, 2021 on for U.S. Appl. No. 16/482,495, filed Jul. 31, 2019, 59 pages.

Non-Final Office Action dated Apr. 2, 2020 on for U.S. Appl. No. 16/132,011, filed Sep. 14, 2018, 5 pages.

Non-Final Office Action dated Mar. 8, 2021 on for U.S. Appl. No. 16/525,142, filed Jul. 29, 2019, 71 pages.

Non-Final Office Action dated Dec. 11, 2019 on for U.S. Appl. No. 16/132,062, filed Sep. 14, 2018, 17 pages.

Non-Final Office Action dated Feb. 12, 2021 on for U.S. Appl. No. 16/528,348, filed Jul. 31, 2019, 54 pages.

Non-Final Office Action dated May 14, 2020 on for U.S. Appl. No. 16/834,987, filed Mar. 30, 2020, 30 pages.

Non-Final Office Action dated Mar. 25, 2021 on for U.S. Appl. No. 16/573,577, filed Sep. 17, 2019, 65 pages.

Non-Final Office Action dated Dec. 10, 2019 for U.S. Appl. No. 16/528,348, filed Jul. 31, 2019, 33 pages.

Non-Final Office Action dated May 11, 2021 for U.S. Appl. No. 16/529,360, filed Aug. 1, 2019, 64 pages.

Non-Final Office Action dated May 28, 2021 for U.S. Appl. No. 16/658,983, filed Oct. 21, 2019, 21 pages.

Non-Final Office Action dated Mar. 30, 2020 for U.S. Appl. No. 16/132,092, filed Sep. 14, 2018, 46 pages.

Notice of Allowance dated May 12, 2021 on for U.S. Appl. No. 16/132,062, filed Sep. 14, 2018, 2 pages.

Notice of Allowance dated Oct. 13, 2020 on for U.S. Appl. No. 16/132,098, filed Sep. 14, 2018, 5 pages.

Notice of Allowance dated Jun. 12, 2020 on for U.S. Appl. No. 16/834,987, filed Mar. 30, 2020, 9 pages.

Notice of Allowance dated Jun. 9, 2021 for U.S. Appl. No. 16/528,348, filed Jul. 31, 2019, 11 pages.

Notice of Allowance dated Feb. 8, 2021 on for U.S. Appl. No. 16/132,062, filed Sep. 14, 2018, 21 pages.

Notice of Allowance dated Feb. 8, 2021 on for U.S. Appl. No. 16/803,109, filed Feb. 27, 2020, 29 pages.

Notice of Allowance dated Feb. 8, 2021 on for U.S. Appl. No. 16/834,987, filed Mar. 30, 2020, 180 pages.

Notice of Allowance dated Jan. 13, 2021 on for U.S. Appl. No. 16/175,246, filed Oct. 30, 2018, 5 pages.

Notice of Allowance dated Sep. 17, 2020 on for U.S. Appl. No. 16/175,246, filed Oct. 30, 2018, 5 pages.

Notice of Allowance dated Nov. 19, 2020 on for U.S. Appl. No. 16/132,062, filed Sep. 14, 2018, 7 pages.

Notice of Allowance dated Apr. 20, 2021 on for U.S. Appl. No. 16/482,495, filed Jul. 31, 2019, 5 pages.

Notice of Allowance dated Jan. 25, 2021 on for U.S. Appl. No. 16/132,098, filed Sep. 14, 2018, 5 pages.

Notice of Allowance dated Jan. 25, 2021 on for U.S. Appl. No. 16/702,894, filed Dec. 4, 2019, 24 pages.

Notice of Allowance dated Jul. 26, 2021 on for U.S. Appl. No. 16/284,610, filed Feb. 25, 2019, 2 pages.

Notice of Allowance dated Jan. 27, 2021 on for U.S. Appl. No. 16/132,092, filed Sep. 14, 2018, 8 pages.

Notice of Allowance dated May 27, 2021 on for U.S. Appl. No. 16/284,610, filed Feb. 25, 2019, 16 pages.

Notice of Allowance dated Jul. 29, 2020 on for U.S. Appl. No. 16/132,011, filed Sep. 14, 2018, 5 pages.

Notice of Allowance dated Oct. 29, 2020 on for U.S. Appl. No. 16/132,092, filed Sep. 14, 2018, 8 pages.

Notice of Allowance dated Oct. 8, 2021 on for U.S. Appl. No. 16/528,348, filed Jul. 31, 2019, 3 pages.

Notice of Allowance dated Apr. 2, 2019, for U.S. Appl. No. 16/175,335, filed Oct. 30, 2018, 12 pages.

Notice of Allowance dated Mar. 2, 2020, for U.S. Appl. No. 16/596,190, filed Oct. 8, 2019, 15 pages.

(56) References Cited

OTHER PUBLICATIONS

Notice of Allowance dated Apr. 6, 2020, for U.S. Appl. No. 16/175,246, filed Oct. 30, 2018, 12 pages.
Notice of Allowance dated Aug. 15, 2019, for U.S. Appl. No. 16/175,146, filed Oct. 30, 2018, 17 pages.
Notice of Allowance dated Sep. 24, 2021 for U.S. Appl. No. 16/528,348, filed Jul. 31, 2019, 06 pages.
Notice of Allowance dated Jan. 27, 2020, for U.S. Appl. No. 16/702,931, filed Dec. 4, 2019, 23 pages.
Notice of Allowance dated Jul. 29, 2019, for U.S. Appl. No. 16/245,532, filed Jan. 11, 2019, 13 pages.
Pashajavid et al., "A Multimode Supervisory Control Scheme for Coupling Remote Droop-Regulated Microgrids," IEEE Transactions on Smart Grid, May 26, 2020, vol. 9(5), pp. 5381-5392. https://ieeexplore.ieee.org/abstract/document/7888570/.
Pashajavid et al., "Frequency Support for Remote Microgrid Systems With Intermittent Distributed Energy Resources—A Two-level Hierarchical Strategy," IEEE Systems Journal, May 26, 2020, vol. 12(3), pp. 2760-2771. https://ieeexplore.ieee.org/abstract/document/7862156/.
Rahimi, Farrokh, "Using a Transactive Energy Framework," IEEE Electrification Magazine, Dec. 2016, pp. 23-29.
Rudez and Mihalic, "Predictive Underfrequency Load Shedding Scheme for Islanded Power Systems With Renewable Generation," Electric Power Systems Research, May 2015, vol. 126, pp. 21-28. doi: 10.1016/j.epsr.2015.04.017.
Soluna., "Powering the Block Chain," Aug. 2018, version 1.1, 29 pages.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Xu et al., "Distributed Load Shedding for Microgrid With Compensation Support via Wireless Network," IET Generation, Transmission & Distribution, May 2018, vol. 12(9), pp. 2006-2018. doi: 10.1049/iet-gtd.2017.1029.
Zhou et al., "Two-Stage Load Shedding for Secondary Control in Hierarchical Operation of Islanded Microgrids," IEEE Transactions on Smart Grid, May 2019, vol. 10(3), pp. 3103-3111. doi: 10.1109/TSG.2018.2817738.
European Patent Application No. 19878191.6, Extended European Search Report dated Jul. 4, 2022.
European Patent Application No. 18900411.2, Extended European Search Report dated Dec. 13, 2021.
European Patent Application No. 19858739.6, Extended European Search Report dated May 31, 2022.
European Patent Application No. 19858812.1, Extended European Search Report dated May 2, 2022.
European Patent Application No. 19861222.8, Extended European Search Report dated May 2, 2022.
European Patent Application No. 19861223.6, Extended European Search Report dated Apr. 19, 2022.
European Patent Application No. 19877576.9, Extended European Search Report dated Jun. 3, 2022.
Final Office Action dated Jan. 6, 2022 on for U.S. Appl. No. 16/529,360, filed Aug. 1, 2019, 40 pages.
Ghamkhari et al., "Energy and Performance Management of Green Data Centers: A Profit Maximization Approach," IEEE Transactions on Smart Grid, Jun. 2013, vol. 4 (2), pp. 1017-1025.
Huang et al., "Data Center Energy Cost Optimization in Smart Grid: a Review," Journal of Zhejiang University (Engineering Science), 2016, vol. 50 (12), pp. 2386-2399.
International Search Report and Written Opinion of PCT Application No. PCT/US2021/045972, dated Nov. 15, 2021, 16 pages.
Kiani et al., "Profit Maximization for Geographical Dispersed Green Data Centers," Arxiv.org, Cornell University Library, 201 Olin Library Cornell University Ithaca, Apr. 2015, pp. 1-5.
Li et al., "iSwitch: Coordinating and Optimizing Renewable Energy Powered Server Clusters," 2012 39th Annual International Symposium on Computer Architecture, Jun. 2012, pp. 512-523.
Non-Final Office Action dated Dec. 24, 2021 on for U.S. Appl. No. 17/128,830, filed Dec. 21, 2020, 4 pages.
Notice of Allowance dated May 31, 2022 on for U.S. Appl. No. 16/529,402, filed Aug. 1, 2019 13 pages.
Notice of Allowance dated Feb. 2, 2022, for U.S. Appl. No. 16/525,142, filed Jul. 29, 2019, 5 pages.
Notice of Allowance dated Feb. 3, 2022, for U.S. Appl. No. 16/573,577, filed Sep. 17, 2019, 8 pages.
Notice of Allowance dated Jan. 5, 2022, for U.S. Appl. No. 16/658,983, filed Oct. 21, 2019, 14 pages.
Notice of Allowance dated Apr. 18, 2022, for U.S. Appl. No. 17/128,830, filed Dec. 21, 2020, 7 pages.
Notice of Allowance dated Jan. 24, 2022, for U.S. Appl. No. 16/525,142, filed Jul. 29, 2019, 9 pages.
Notice of Allowance dated Jan. 26, 2022, for U.S. Appl. No. 17/328,275, filed May 24, 2021, 10 pages.
Wang et al., "SHIP: Scalable Hierarchical Power Control for Large-scale Data Centers," 2009 18th International Conference onParallel Architectures and Compilation Techniques, Sep. 2009, pp. 91-100.
Wierman et al., "Opportunities and Challenges for Data Center Demand Response," International Green Computing Conference,IEEE, Nov. 2014, pp. 1-10.
Ackeret et al., "Aerodynamic Heat-Power Engine Operating on a Closed Cycle," NACA Technical Memorandum, No. 1034, Nov. 1942, 35 pages.
Al-Attab et al., "Externally Fired Gas Turbine Technology: A Review," Applied Energy, 2015, pp. 474-487, vol. 138.
Anheden, M., "Economic Evaluation of Externally Fired Gas Turbine Cycles for Small-Scale Biomass Cogeneration," Technical Report, Jan. 2001, 112 pages.
Bammert et al., "Layout and Present Status of the Closed-Cycle Helium Turbine Plant Oberhausen," ASME 1974 International Gas Turbine Conference and Products Show, 1974, 9 pages.
Bammert et al., "Operation and Control of the 50-Mw Closed-Cycle Helium Turbine Oberhausen," ASME 1974 International Gas Turbine Conference and Products Show, Mar. 1974, 8 pages.
Bammert et al., "Status Report on Closed-Cycle Power Plants in the Federal Republic of Germany," Journal of Engineering for Power, Jan. 1977, pp. 37-46, vol. 99, No. 1.
Bammert et al., "Twenty-Five Years of Operating Experience With the Coal-Fired, Closed-Cycle Gas Turbine Cogeneration Plant at Coburg," Journal of Engineering for Power, Oct. 1983, 10 pages, vol. 105.
Baofix, Historical Review of Closed Cycle Gas Turbine (CCGT) Power Plants, Malta, 20 Pages.
Bardia, Alexander, "Dynamics and Control Modeling of the Closed-cycle Gas Turbine (GT-HTGR) Power Plant," Fourth Power Plant Dynamics, Control and Testing Symposium, General Atomic Company, Feb. 1980, 35 pages.
Bauer et al., "Sodium Nitrate for High Temperature Latent Heat Storage," The 11th International Conference on Thermal Energy Storage-Effstock, Jun. 2009, 8 pages.
Böke, Erhan, "Comparison of Thermal Efficiency of the Closed-Cycle Gas Turbine with and without Regeneration," The Second Scientific Technical Seminar on Gas Turbine Engine, Nov. 1996, 9 pages.
Boyce, Meherwan P., "7—Axial-Flow Compressors," Gas Turbine Engineering Handbook (Fourth Edition), 2012, pp. 303-355.
Boyce, Meherwan P., "Axial-Flow compressors", 2003 (date estimated), Internet, 33 pages.
Bradshaw et al., "Molten Nitrate Salt Development for Thermal Energy Storage in Parabolic Trough Solar Power Systems," ASME 2008 2nd International Conference on Energy Sustainability, ES2008-54174, 2008, pp. 631-637, vol. 2.
Crotogino et al., "Huntorf CAES: More than 20 Years of Successful Operation," Spring Meeting, Apr. 2001, 7 pages.
Desrues et al., "A Thermal Energy Storage Process for Large Scale Electric Applications," Applied Thermal Engineering, Apr. 2010, pp. 425-432, vol. 30, No. 5.

(56) References Cited

OTHER PUBLICATIONS

Deuster et al., "Long-Time Operating Experiences with Oberhausen Closed-Cycle Gas-Turbine Plant," ASME 1970 International Gas Turbine Conference and Products Show, Jan. 1970, 15 pages.
Dewing Ernest W., "Heat Capacities of Liquid Sodium and Potassium Nitrates," Journal of Chemical and Engineering, 1975, pp. 221-223, vol. 20, No. 3.
Diguilio, R.M. et al., "The Thermal Conductivity of the Molten NaNO3—KNO3 Eutectic Between 525 and 590 K," International Journal of Thermophysics, Jul. 1992, pp. 575-592, vol. 13, No. 4.
Eisenberg, B., "Development of a New Front Stage for an Industrial Axial Flow Compressor," The American Society of Mechanical Engineers, Feb. 2015, 9 pages, Paper No. 93-GT-327.
European Patent Application No. 17885998.9, Extended European Search Report dated Jul. 13, 2020.
European Patent Application No. 17886005.2, Extended European Search Report dated Jul. 22, 2020.
European Patent Application No. 17886168.8, Extended European Search Report dated Oct. 19, 2020.
European Patent Application No. 17886168.8, Partial Supplementary European Search Report dated Jul. 15, 2020.
European Patent Application No. 17886274.4, Extended European Search Report dated Oct. 19, 2020.
European Patent Application No. 17886274.4, Partial Supplementary European Search Report dated Jul. 15, 2020.
European Patent Application No. 17887008.5, Extended European Search Report dated Jul. 20, 2020.
Final Office Action dated Jun. 12, 2019 for U.S. Appl. No. 15/392,927, filed Dec. 28, 2016, 42 pages.
Final Office Action dated Jun. 25, 2020, for U.S. Appl. No. 16/289,017, filed Feb. 28, 2019, 22 pages.
Final Office Action dated Jun. 25, 2020, for U.S. Appl. No. 16/354,824, filed Mar. 15, 2019, 21 pages.
Final Office Action dated Apr. 28, 2020 for U.S. Appl. No. 15/392,542, filed Dec. 28, 2016, 27 pages.
Final Office Action dated Aug. 1, 2017, for U.S. Appl. No. 13/965,048, filed Aug. 12, 2013, 16 pages.
Final Office Action dated Apr. 2, 2019, for U.S. Appl. No. 15/440,312, filed Feb. 23, 2017, 13 pages.
Final Office Action dated Jun. 6, 2018 for U.S. Appl. No. 15/396,461, filed Dec. 31, 2016, 10 pages.
Final Office Action dated Nov. 6, 2015, for U.S. Appl. No. 12/932,775, filed Mar. 4, 2011, 15 pages.
Final Office Action dated Apr. 8, 2020 for U.S. Appl. No. 15/395,622, filed Dec. 30, 2016, 26 pages.
Final Office Action dated Jan. 9, 2014 for U.S. Appl. No. 12/932,775, filed Mar. 4, 2011, 11 pages.
Final Office Action dated Feb. 19, 2019 for U.S. Appl. No. 15/440,289, filed Feb. 23, 2017, 10 pages.
Final Office Action dated Feb. 21, 2019 for U.S. Appl. No. 15/440,297, filed Feb. 23, 2017, 11 pages.
Final Office Action dated Aug. 22, 2016, for U.S. Appl. No. 13/965,048, filed Aug. 12, 2013, 13 pages.
Final Office Action dated Jul. 25, 2017 for U.S. Appl. No. 12/932,775, filed Mar. 4, 2011, 19 pages.
Final Office Action dated Sep. 25, 2017, for U.S. Appl. No. 14/668,610, filed Mar. 25, 2015, 28 pages.
Fraas et al., "Summary of Research and Development Effort on Closed-cycle Gas Turbines," Engineering Technology Division, Jun. 1981, 39 pages.
Früchtel et al., "Development of the GT36 Sequential Combustor," Ansaldo Energio, 2017, 18 pages.
Freeman, Eli S., "The Kinetics of the Thermal Decomposition of Sodium Nitrate and of the Reaction Between Sodium Nitrate and Oxygen," The Journal of Physical Chemistry, Nov. 1956, pp. 1487-1493, vol. 60, No. 11.
Frutschi, Hans Ulrich, "Closed-Cycle Gas Turbines," New York, ASME, 2005, Jan. 29, 2016, 293 pages. Retrieved from the internet: [URL:http://ebooks.asmedigitalcollection.asme.org/books.aspx].

Gamannossi et al., "Analysis of the GT26 Single Shaft Gas Turbine Performance and Emissions," Energy Procedia, Sep. 2017, pp. 461-468, vol. 126.
Hansen, Curt, "Land Based Gas Turbines for Power Production," ASEN 5063, Dec. 2009, 18 pages.
Ho et al., "Cost and Performance Tradeoffs of Alternative Solar Driven S—CO2 Brayton Cycle Configuration," Proceedings of the ASME 2015 Power and Energy Conversion Conference, Jul. 2015, 10 pages.
International Preliminary Reporton Patentability for Application No. PCT/US2013/062469, dated Mar. 31, 2015, 9 pages.
International Search Report and Written Opinion of PCT Application No. PCT/US2013/062469, dated Jan. 2, 2014, 11 pages.
International Search Report and Written Opinion of PCT Application No. PCT/US2017/062117, dated Feb. 22, 2018, 17 pages.
International Search Report and Written Opinion of PCT Application No. PCT/US2017/063289, dated Apr. 16, 2018, 17 pages.
International Search Report and Written Opinion of PCT Application No. PCT/US2017/063519, dated Apr. 12, 2018, 16 pages.
International Search Report and Written Opinion of PCT Application No. PCT/US2017/063521, dated Mar. 12, 2018, 18 pages.
International Search Report and Written Opinion of PCT Application No. PCT/US2017/064074, dated Feb. 26, 2018, 13 pages.
International Search Report and Written Opinion of PCT Application No. PCT/US2017/064076, dated Jul. 30, 2018, 15 pages.
International Search Report and Written Opinion of PCT Application No. PCT/US2017/064839, dated Mar. 20, 2018, 13 pages.
International Search Report and Written Opinion of PCT Application No. PCT/US2017/065200, dated Mar. 26, 2018, 15 pages.
International Search Report and Written Opinion of PCT Application No. PCT/US2017/065201, dated Mar. 27, 2018, 13 pages.
International Search Report and Written Opinion of PCT Application No. PCT/US2017/065643, dated Mar. 29, 2018, 17 pages.
International Search Report and Written Opinion of PCT Application No. PCT/US2017/065645, dated Mar. 26, 2018, 16 pages.
International Search Report and Written Opinion of PCT Application No. PCT/US2017/067049, dated Mar. 29, 2018, 16 pages.
Isentropic, "A New Era in Electrical Energy Storage and Recovery," 2014, 2 pages. Retrieved from the internet: [URL:http://www.isenlropic.co.uk/our-phesechnology].
John, "Stem and CPower to Combine Behind-the-Meter Batteries and Demand Response," Energy Storage, Aug. 8, 2017, 1 page.
Keller et al., "Industrial Closed-Cycle Gas Turbines for Conventional and Nuclear Fuel," ASME 1967 Gas Turbine Conference and Products Show, 1967, 14 pages.
Keller et al., "Operating Experience and Design Features of Closed Cycle Gas Turbine Power Plants," The American Society of Mechanical Engineers (ASME) 1956 Gas Turbine Power Conference, Apr. 1956, 52 pages.
Keller et al., "The Aerodynamic Turbine in the Iron and Steel Works," Swiss Construction Newspaper, 1943, 7 pages, vol. 121/122.
Keller et al., "The Coal-Burning Closed-Cycle Gas Turbine," ASME 1961 Gas Turbine Power Conference and Exhibit, 1961, 7 pages.
Keller, Curt, "Forty Years of Experience on Closed-Cycle Gas Turbines," Annals of Molecular Biology, Jun. 1978, pp. 405-422, vol. 5.
Kuo et al., "Closed Cycle Gas Turbine Systems in Europe," United Technology Research Center, Office of Naval Research, Mar. 1977, 24 pages.
Kuo et al., "The Prospects for Solar-Powered Closed-Cycle Gas Turbines," The American Society of Mechanical Engineers, Mar. 1980, 9 pages.
Kupiec, Hailey, "Chamfer or Fillet: It's More than a Coin Toss," 2016, Engineering.com, 3 pages, Retrieved from the internet: URL:https://www.engineering.com/AdvancedManufacturing/ArticleID/12682/Chamfer-or-Fillet-Its-More-Than-a-Coin-Toss.aspx.
La Fleur et al., "The Closed-Cycle Gas Turbine and Cryogenics: A New Application," ASME 1965 Gas Turbine Conference and Products Show, 1965, 5 pages.
La Fleur, James K., "Description of an Operating Closed Cycle—Helium Gas Turbine," The American Society of Mechanical Engineers, 1963, 8 pages, Paper No. 63-AGHT-74.

(56) References Cited

OTHER PUBLICATIONS

Laughlin et al., U.S. Appl. No. 61/706,337, filed Sep. 27, 2012, 28 pages.
Laughlin et al., U.S. Appl. No. 61/868,070, filed Aug. 20, 2013, 31 pages.
Laughlin, R.B., "Here Comes the Sun," Stanford Physics Department Colloquium, Jan. 2010, 23 pages.
Laughlin R.B., U.S. Appl. No. 61/339,577, filed Mar. 4, 2010, 18 pages.
MacNaghten, James, "Commercial Potential of Different Large Scale Thermal Storage Technologies Under Development Globally," Isentropic LTD, Jun. 2016, 21 pages.
Man Turbo, Engineering the Future, Since 1758, Apr. 2009, 40 pages.
McDonald et al., "Helium and Combustion Gas Turbine Power Conversion Systems Comparison," ASME 1995 International Gas Turbine and Aeroengine Congress and Exposition, Jun. 1995, 12 pages.
McDonald et al., "Helium Turbomachinery Operating Experience From Gas Turbine Power Plants and Test Facilities," Applied Thermal Engineering, 2012, pp. 108-142, vol. 44.
McDonald et al., "Closed-Cycle Gas Turbine Applications for Fusion Reactors," The American Society of Mechanical Engineers, Dec. 1981, pp. 1-18, vol. 13, No. 1.
Morimoto et al., "The 2000kw Gas Turbine Plant," Mechanical Div., Engineering Department, 1956, pp. 63-68, vol. 2, No. 3.
Morimoto et al., "The First Closed-Cycle Gas Turbine Power Plant in Japan," Thermal Machine Div., Design Dep't., 1958, pp. 57-64, vol. 4, No. 3.
Morimoto, Takaoki, "12.000 KW Gas Turbine Power Generating Unit for Steel Works," Fuji Denki Review, 1960, pp. 93-101, vol. 8, No. 4.
Non-Final Office Action dated Nov. 13, 2019, for U.S. Appl. No. 15/392,542, filed Dec. 28, 2016, 13 pages.
Non-Final Office Action dated Jun. 9, 2020 for U.S. Appl. No. 15/392,542, filed Dec. 28, 2016, 17 pages.
Non-Final Office Action dated Apr. 1, 2019 for U.S. Appl. No. 15/393,891, filed Dec. 29, 2016, 13 pages.
Non-Final Office Action dated Nov. 1, 2018, for U.S. Appl. No. 15/440,297, filed Feb. 23, 2017, 11 pages.
Non-Final Office Action dated Nov. 3, 2016, for U.S. Appl. No. 12/932,775, filed Mar. 4, 2011, 17 pages.
Non-Final Office Action dated Dec. 4, 2015, for U.S. Appl. No. 13/965,048, filed Aug. 12, 2013, 11 pages.
Non-Final Office Action dated May 4, 2020, for U.S. Appl. No. 16/289,017, filed Feb. 28, 2019, 84 pages.
Non-Final Office Action dated May 4, 2020, for U.S. Appl. No. 16/354,824, filed Mar. 15, 2019, 83 pages.
Non-Final Office Action dated Feb. 5, 2020, for U.S. Appl. No. 16/111,151, filed Aug. 23, 2018, 9 pages.
Non-Final Office Action dated Feb. 8, 2018, for U.S. Appl. No. 15/396,461, filed Dec. 31, 2016, 09 pages.
Non-Final Office Action dated Nov. 8, 2018, for U.S. Appl. No. 15/440,300, filed Feb. 23, 2017, 26 pages.
Non-Final Office Action dated Jan. 9, 2019, for U.S. Appl. No. 15/396,461, filed Dec. 31, 2016, 13 pages.
Non-Final Office Action dated Jan. 11, 2019, for U.S. Appl. No. 15/440,312, filed Feb. 23, 2017, 14 pages.
Non-Final Office Action dated Apr. 13, 2020, for U.S. Appl. No. 16/260,859, filed Jan. 29, 2019, 72 pages.
Non-Final Office Action dated Apr. 13, 2020, for U.S. Appl. No. 16/260,932, filed Jan. 29, 2019, 71 pages.
Non-Final Office Action dated Feb. 13, 2018, for U.S. Appl. No. 14/668,610, filed Mar. 25, 2015, 13 pages.
Non-Final Office Action dated May 14, 2018, for U.S. Appl. No. 15/392,653, filed Dec. 28, 2016, 26 pages.
Non-Final Office Action dated May 14, 2018, for U.S. Appl. No. 15/392,657, filed Dec. 28, 2016, 27 pages.
Non-Final Office Action dated Jan. 15, 2019, for U.S. Appl. No. 15/440,295, filed Feb. 23, 2017, 22 pages.
Non-Final Office Action dated Nov. 15, 2018, for U.S. Appl. No. 15/440,306, filed Feb. 23, 2017, 13 pages.
Non-Final Office Action dated Oct. 17, 2019, for U.S. Appl. No. 15/395,622, filed Dec. 30, 2016, 14 pages.
Non-Final Office Action dated Mar. 23, 2017 for U.S. Appl. No. 13/965,048, filed Aug. 12, 2013, 20 pages.
Non-Final Office Action dated May 25, 2018, for U.S. Appl. No. 15/393,874, filed Dec. 29, 2016.
Non-Final Office Action dated Feb. 26, 2015, for U.S. Appl. No. 12/932,775, filed Mar. 4, 2011, 14 pages.
Non-Final Office Action dated Mar. 26, 2019 for U.S. Appl. No. 15/392,523, filed Dec. 28, 2016, 9 pages.
Non-Final Office Action dated Jan. 28, 2021, for U.S. Appl. No. 16/289,017, filed Feb. 28, 2019, 16 pages.
Non-Final Office Action dated Jun. 28, 2018, for U.S. Appl. No. 15/392,927, filed Dec. 28, 2016, 11 pages.
Non-Final Office Action dated Mar. 28, 2013, for U.S. Appl. No. 12/932,775, filed Mar. 4, 2011, 12 pages.
Non-Final Office Action dated Jan. 31, 2017, for U.S. Appl. No. 14/668,610, filed Mar. 25, 2015, 38 pages.
Non-Final Office Action dated Oct. 31, 2018, for U.S. Appl. No. 15/440,289, filed Feb. 23, 2017, 25 pages.
Notice of Allowance dated Jun. 1, 2020, for U.S. Appl. No. 16/111,151, filed Aug. 23, 2018, 14 pages.
Notice of Allowance dated Jun. 10, 2020 for U.S. Appl. No. 15/395,622, filed Dec. 30, 2016, 17 pages.
Notice of Allowance dated Apr. 29, 2020, for U.S. Appl. No. 16/111,151, filed Aug. 23, 2018, 17 pages.
Notice of Allowance dated Oct. 15, 2020 on for U.S. Appl. No. 16/260,932, filed Jan. 29, 2019, 7 pages.
Notice of Allowance dated Jun. 15, 2020 for U.S. Appl. No. 16/260,859, filed Jan. 29, 2019, 11 pages.
Notice of Allowance dated Jun. 22, 2020, for U.S. Appl. No. 16/260,932, filed Jan. 29, 2019, 10 pages.
Notice of Allowance dated Dec. 24, 2020 on for U.S. Appl. No. 16/576,329, filed Sep. 19, 2019, 11 pages.
Notice of Allowance dated Jul. 1, 2019 for U.S. Appl. No. 15/440,312, filed Feb. 23, 2017, 19 pages.
Notice of Allowance dated Jun. 3, 2019 for U.S. Appl. No. 15/440,289, filed Feb. 23, 2017, 23 pages.
Notice of Allowance dated Jun. 3, 2019 for U.S. Appl. No. 15/440,295, filed Feb. 23, 2017, 14 pages.
Notice of Allowance dated Aug. 5, 2020 for U.S. Appl. No. 15/395,622, filed Dec. 30, 2016, 4 pages.
Notice of Allowance dated Jun. 5, 2018, for U.S. Appl. No. 15/392,571, filed Dec. 28, 2016, 11 pages.
Notice of Allowance dated Sep. 6, 2019 for U.S. Appl. No. 15/440,300, filed Feb. 23, 2017, 20 pages.
Notice of Allowance dated Oct. 7, 2020 for U.S. Appl. No. 16/260,859, filed Jan. 29, 2019, 7 pages.
Notice of Allowance dated Apr. 8, 2019 for U.S. Appl. No. 15/440,297, filed Feb. 23, 2017, 5 pages.
Notice of Allowance dated Jul. 8, 2019, for U.S. Appl. No. 15/440,297, filed Feb. 23, 2017, 5 pages.
Notice of Allowance dated Apr. 9, 2019, for U.S. Appl. No. 15/440,306, filed Feb. 23, 2017, 2 pages.
Notice of Allowance dated Apr. 11, 2019 for U.S. Appl. No. 15/396,461, filed Dec. 31, 2016, 7 pages.
Notice of Allowance dated Mar. 11, 2019 for U.S. Appl. No. 15/440,306, filed Feb. 23, 2017, 8 pages.
Notice of Allowance dated Sep. 11, 2019 for U.S. Appl. No. 15/396,461, filed Dec. 31, 2016, 8 pages.
Notice of Allowance dated Sep. 11, 2020 for U.S. Appl. No. 16/260,929, filed Jan. 29, 2019, 10 pages.
Notice of Allowance dated Jun. 15, 2018, for U.S. Appl. No. 15/395,040, filed Dec. 30, 2016, 12 pages.
Notice of Allowance dated Apr. 17, 2019 for U.S. Appl. No. 15/440,295, filed Feb. 23, 2017, 5 pages.
Notice of Allowance dated Feb. 19, 2019 for U.S. Appl. No. 15/440,300, filed Feb. 23, 2017, 8 pages.
Notice of Allowance dated May 19, 2020 for U.S. Appl. No. 16/260,929, filed Jan. 29, 2019, 80 pages.

(56) References Cited

OTHER PUBLICATIONS

Notice of Allowance dated Oct. 19, 2018 for U.S. Appl. No. 15/392,653, filed Dec. 28, 2016, 5 pages.
Notice of Allowance dated May 21, 2018 for U.S. Appl. No. 14/668,610, filed Mar. 25, 2015, 2 pages.
Notice of Allowance dated Jan. 22, 2019 for U.S. Appl. No. 15/440,308, filed Feb. 23, 2017, 8 pages.
Notice of Allowance dated Jul. 22, 2019 for U.S. Appl. No. 15/392,927, filed Dec. 28, 2016, 8 pages.
Notice of Allowance dated Sep. 23, 2020 for U.S. Appl. No. 16/260,929, filed Jan. 29, 2019, 5 pages.
Notice of Allowance dated Jul. 24, 2020 for U.S. Appl. No. 16/576,357, filed Sep. 19, 2019, 9 pages.
Notice of Allowance dated Sep. 25, 2020 for U.S. Appl. No. 16/111,151, filed Aug. 23, 2018, 9 pages.
Notice of Allowance dated Apr. 26, 2018, for U.S. Appl. No. 14/668,610, filed Mar. 25, 2015, 12 pages.
Notice of Allowance dated Dec. 28, 2017, for U.S. Appl. No. 13/965,048, filed Aug. 12, 2013, 9 pages.
Notice of Allowance dated Jun. 28, 2019 for U.S. Appl. No. 15/440,306, filed Feb. 23, 2017, 5 pages.
Notice of Allowance dated May 28, 2019 for U.S. Appl. No. 15/440,300, filed Feb. 23, 2017, 8 pages.
Notice of Allowance dated Apr. 29, 2019 for U.S. Appl. No. 15/440,289, filed Feb. 23, 2017, 5 pages.
Notice of Allowance dated May 30, 2018 for U.S. Appl. No. 14/668,610, filed Mar. 25, 2015, 1 pages.
Notice of Allowance dated Dec. 31, 2018 for U.S. Appl. No. 15/393,874, filed Dec. 29, 2016, 5 pages.
Notice of Allowance dated May 31, 2018 for U.S. Appl. No. 12/932,775, filed Mar. 4, 2011, 10 pages.
Notice of Allowance dated Sep. 3, 2019, for U.S. Appl. No. 15/396,461, filed Dec. 31, 2016, 7 pages.
Nunes et al., "Viscosity of Molten Sodium Nitrate," International Journal of Thermophysics, Nov. 2006, pp. 1638-1649, vol. 27, No. 6.
Olumayegun et al., "Closed-Cycle Gas Turbine for Power Generation: A State-of-the-Art Review," Fuel, Sep. 2016, pp. 694-717, vol. 180.
Parsons., "Cost Estimates for Thermal Peaking Power Plant," Parsons Brinckerhoff New Zealand Ltd, 2008, Version 2, 26 pages.
Pasch et al., "Supercritical Carbon Dioxide Closed Brayton Cycle: Development and Applications," Sandia National Laboratories, Albuquerque, NM (United States), 2014, 16 pages.
Pathirathna, K.A.B., "Gas Turbine Thermodynamic and Performance Analysis Methods Using Available Catalog Data", Faculty of Engineering and Sustainable Development, Oct. 2013, 103 pages.
Peng et al, "High-Temperature Thermal Stability of Molten Salt Materials," International Journal of Energy Research, Oct. 2008, pp. 1164-1174, vol. 32, No. 12.
Pickett et al., "Heated Turbulent Flow of Helium-Argon Mixtures in Tubes," International Journal of Heat and Mass Transfer, May 1979, pp. 705-719, vol. 22, No. 5.
Raade et al, "Development of Molten Salt Heat Transfer Fluid With Low Melting Point and High Thermal Stability," Journal of Solar Energy Engineering, Aug. 2011, pp. 031013-1 to 031013-6, vol. 133, No. 3.
Rochau, Gary E., "Supercritical CO2 Brayton Cycle Development," Advance SMR Energy Conversion, Nuclear Energy, Jun. 2014, 23 pages.
Ruer et al, "Pumped Heat Energy Storage," 2010, pp. 1-14.
Scott et al., "The Redesign and Simulated Test of a Small Closed Brayton Cycle Turbine-compressor Set for Nuclear Application," ASME 1969 Gas Turbine Conference and Products Show, 1969, 11 pages.
Silverman et al., "Survey of Technology for Storage of Thermal Energy in Heat Transfer Salt," Oak Ridge National Laboratory, ORNL/TM-5682, Jan. 1977, 32 pages.
Stiesdal et al., "Stiesdal Gridscale Battery Technology Addresses the Growing Need for Reliable, Cost-Effective Bulk Energy Storage," Stiesdal Storage Technologies, Jan. 2019, pp. 23.
Taygun et al., "Conventional and Nuclear Gas Turbines for Combined Power and Heat Production," ASME 1970 International Gas Turbine Conference and Products Show, 1970, 9 pages.
Taygun, F., "Discussion: Bureau of Mines Progress in Developing Open and Closed-Cycle Coal-Burning Gas Turbine Power Plants," Journal of Engineering for Power, Oct. 1966, pp. 320-322, vol. 88, No. 4.
Turchi, Craig, "NREL Advanced Concepts," Solar Energy Technologies Program Peer Review, May 2010, 13 pages.
Vanco, Michael R., "Analytical Comparison of Relative Heat-Transfer Coefficients and Pressure Drops of Inert Gases and Their Binary Mixtures," U.S. National Aeronautics and Space Administration, Feb. 1965, 18 pages.
Way, Julie, "Storing the Sun: Molten Salt Provides Highly Efficient Thermal Storage," LTD, Jun. 2008, 2 pages. http://www.renewableenergyworld.com/articles/2008/06/storing-the-sun-molten-salt-provides-highly-efficient-thermalstorage-52873.html.
Wesoff, Eric, "Breakthrough in Energy Storage: Isentropic Energy," Feb. 2010, 3 pages,https://www.greentechmedia.com/articles/read/breakthrough-in-utility-scale-energy-storage-isentropic.
Yergovich et al, "Density and Viscosity of Aqueous Solutions of Methanol and Acetone from the Freezing Point to 10.degree. C," Journal of Chemical and Engineering Data, Apr. 1971, pp. 222-226, vol. 16, No. 2.
Zabrasnsky et al., "Heat Capacities of Organic Compounds in the Liquid State I. C1 to C18 1-Alkanols," Journal of Physical and Chemical Reference Data, May 1990, pp. 719-762, vol. 19, No. 3.
Abhyankar et al., "Using PETSc to Develop Scalable Applications for Next-Generation Power Grid," High Performance Computing, Networking and Analytics for the Power Grid, Nov. 2011 pp. 67-74 https://doi.org/10.1145/2096123.2096138.
Chen et al., "Power Trading Model for Distributed Power Generation Systems Based on Consortium Blockchains," Proceedings of the 12th Asia-Pacific Symposium on Internetware, Jul. 2021, pp. 91-98. https://doi.org/10.1145/3457913.3457929.
ERCOT, Business Procedures, Load Resource Qualification, Initial Qualification and Periodic Testing, Controllable Load Qualification Test Procedure for Ancillary Services (Jun. 1, 2014).
ERCOT, Business Procedures, Load Resource Qualification, Non-Controllable Load Resource Qualification and Testing Procedure, V1.1 (Apr. 1, 2011).
ERCOT, Controllable Load Resource (CLR) Participation in the ERCOT Market (Dec. 20, 2007).
ERCOT, Emergency Response Service Technical Requirements & Scope of Work, Oct. 1, 2018 through Jan. 31, 2019.
ERCOT, ERS QSE Training 101, Updated Apr. 6, 2022.
ERCOT, Large Flexible Load Resource Participation in the ERCOT Region, presentation to Large Flexible Load Task Force (Apr. 26, 2022).
ERCOT, Load Resource Participation in the ERCOT Region, presentation (Sep. 27, 2022).
ERCOT, Nodal Protocols (Oct. 18, 2019)—Applicant particularly notes the following pp. 2-4, 2-5, 2-15, 2-17, 2-24 to 26, 2-28, 2-29, 2-38, 2-41, 2-51, 2-52, 2-58, 2-62 to 63, 2-67, 2-69, 3-77 to 80, 3-176 to 3-186, 3-208 to 213, 3-214 to 216, 4-1 to 4, 4-10, 4-20, 4-25 to 27, 4-59 to 62, 4-64 to 67, 6-100 to 116, 8-1 to 58.
European Patent Application No. 20738289.6, Extended European Search Report dated Aug. 8, 2022.
European Patent Application No. 22157111.0, Extended European Search Report dated Aug. 17, 2022.
Final Office Action dated Dec. 1, 2022 for U.S. Appl. No. 17/101,784, filed Mar. 16, 2013, 14 pages.
Hung et al., "Application of Improved Differential Evolution Algorithm for Economic and Emission Dispatch of Thermal Power Generation Plants," Proceedings of the 3rd International Conference on Machine Learning and Soft Computing, Jan. 2019, pp. 93-98. https://doi.org/10.1145/3310986.3311003.

(56) References Cited

OTHER PUBLICATIONS

Kim et al., "Automated di/dt Stressmark Generation for Microprocessor Power Delivery Networks," IEEE/ACM International Symposium on Low Power Electronics and Design, Aug. 2011, pp. 253-258.
Ko., "Ultra-Low Power Challenges for the next Generation ASIC," International Symposium on Low Power Electronics and Design, Jul. 2012, pp. 365-366. https://doi.org/10.1145/2333660.2333743.
Li et al., "Research on Evaluation Method of Integrated Energy Service Level of Power Generation Enterprises," Informatics, Environment, Energy and Applications, Jun. 2021, pp. 57-62. https://doi.org/10.1145/3458359.3458372.
Lin et al., "Automated Classification of Power Plants by Generation Type," E-Energy '20: Proceedings of the Eleventh ACM International Conference on Future Energy Systems, Jun. 2020, pp. 86-96. https://doi.org/10.1145/3396851.3397708.
Marcano et al., "Soil Power?: Can Microbial Fuel Cells Power Non-Trivial Sensors?," LP-IoT'21, Proceedings of the 1st ACM Workshop on No Power and Low Power Internet-of-Things, Jan. 2022, pp. 8-13. https://doi.org/10.1145/3477085.3478989.
Miyazaki et al., "Electric-Energy Generation Using Variable-Capacitive Resonator for Power-Free LSI: Efficiency Analysis and Fundamental Experiment," International Symposium on Low Power Electronics and Design, Aug. 2003, pp. 193-198, Doi: 10.1109/LPE.2003.1231861.
Nawaz et al., "Assisting the Power Generation Sector Toward Sustainability—an Lot Based System for Power Theft Detection With Theft Location Identification," Proceedings of the 2nd International Conference on Computing Advancements, Aug. 2022, pp. 309-315, https://doi.org/10.1145/3542954.3542999.
Non-Final Office Action dated Oct. 6, 2022 on for U.S. Appl. No. 17/331,440, filed May 26, 2021, 4 pages.
Non-Final Office Action dated Nov. 7, 2022 on for U.S. Appl. No. 17/692,636, filed Mar. 11, 2022, 9 pages.
Non-Final Office Action dated Dec. 8, 2022 for U.S. Appl. No. 17/340,643, filed Jun. 7, 2021, 5 pages.
Non-Final Office Action dated Aug. 25, 2022 on for U.S. Appl. No. 16/529,360, filed Aug. 1, 2019, 91 pages.
Non-Final Office Action dated Sep. 29, 2022 on for U.S. Appl. No. 17/353,285, filed Jun. 21, 2021, 16 pages.
Notice of Allowance dated Dec. 2, 2022 for U.S. Appl. No. 17/328,337, filed May 24, 2021, 5 pages.
Notice of Allowance dated Dec. 2, 2022 on for U.S. Appl. No. 17/673,318, filed Feb. 16, 2022, 17 pages.
Notice of Allowance dated Nov. 2, 2022 on for U.S. Appl. No. 17/340,886, filed Jun. 7, 2021, 9 pages.
Notice of Allowance dated Aug. 10, 2022 for U.S. Appl. No. 17/328,337, filed May 24, 2021, 9 pages.
Notice of Allowance dated Nov. 23, 2022 on for U.S. Appl. No. 17/340,664, filed Jun. 7, 2021, 2 pages.
Notice of Allowance dated Aug. 3, 2022, for U.S. Appl. No. 17/340,886, filed Jun. 7, 2021, 09 pages.
Notice of Allowance dated Nov. 9, 2022, for U.S. Appl. No. 17/340,664, filed Dec. 16, 2013, 4 pages.
Sakurai., "Next-Generation Power-Aware Design," ISLPED, Aug. 2008, pp. 383-384.
Sankaragomathi et al., "Optimal Power and Noise for Analog and Digital Sections of a Low Power Radio Receiver," International Symposium on Low Power Electronics & Design, Aug. 2008, pp. 271-276. https://doi.org/10.1145/1393921.1393993.
Sethuraman et al., "Multicasting Based Topology Generation and Core Mapping for a Power Efficient Networks-On-Chip," International Symposium on Low Power Electronics & Design, Aug. 2007, pp. 399-402. https://doi.org/10.1145/1283780.1283868.
Singh et al., "Targeted Random Test Generation for Power-Aware Multicore Designs," ACM Transactions on Design Automation of Electronic Systems, Jun. 2012, vol. 17(3), pp. 1-19. https://doi.org/10.1145/2209291.2209298.
Tao et al., "Simulation Model of Photo-Voltaic Grid-Connected Power Generation," Artificial Intelligence and Advanced Manufacture, Mar. 2022, pp. 2921-2926. https://doi.org/10.1145/3495018.3501208.
Villani et al., "RF Power Transmission:Energy Harvesting for Self-Sustaining Miniaturized Sensor Nodes," Embedded Networked Sensor Systems, Sensys, Nov. 2021, pp. 592-593. https://doi.org/10.1145/3485730.3493365.
Yang et al., "Investment Value Analysis of Household Rooftop PV Power Generation Project under Carbon Trading Mode," Information Management and Management Science, Aug. 2019, pp. 160-165. https://doi.org/10.1145/3357292.3357330.
Zhang et al., "Calculation of the Carrying Capacity of Distrubuted Power Generation in Distribution Network Under Carbon Peaking and Carbon Neutrality Goals," Electrical, Power and Computer Engineering, Apr. 2022, pp. 1-5. https://doi.org/10.1145/3529299.3529308.
Zhang et al., "Wind Power Generation Prediction Based on LSTM," International Conference on Mathematics and Artificial Intelligence, Apr. 2019, pp. 85-89. https://doi.org/10.1145/3325730.3325735.
Zhou et al., "An Online Power Generation Dispatching Method to Improve the Small Signal Stability of Power System with Fluctuated Wind Power," Electrical Power and Computer Engineering, Apr. 2022, pp. 1-12. https://doi.org/10.1145/3529299.3529302.
U.S. Appl. No. 62/556,880, filed Sep. 11, 2017 (claims, spec, and appendix).
Advisory Action dated Mar. 22, 2023 for U.S. Appl. No. 17/101,784, filed Nov. 23, 2020, 3 pages.
Examination Report dated Jan. 17, 2023 for EP Application No. EP19858812.1 filed Mar. 25, 2021.
Examination Report dated Dec. 9, 2022 for EP Application No. EP2019086122.3 filed Sep. 13, 2019.
Final Office Action dated Jan. 20, 2023 for U.S. Appl. No. 17/331,440, filed May 26, 2021, 17 pages.
Non-Final Office Action dated Mar. 17, 2023 for U.S. Appl. No. 17/868,381, filed Jul. 19, 2022, 49 pages.
Non-Final Office Action dated Mar. 29, 2023 for U.S. Appl. No. 18/066,616, filed Dec. 15, 2022, 120 pages.
Non-Final Office Action dated Dec. 20, 2022, for U.S. Appl. No. 17/513,558, filed Oct. 28, 2021, 16 pages.
Notice of Allowance dated Apr. 4, 2023, for U.S. Appl. No. 17/673,318, filed Feb. 16, 2022, 2 pages.
Notice of Allowance dated Feb. 21, 2023, for U.S. Appl. No. 17/340,664, filed Jun. 7, 2021, 2 pages.
Notice of Allowance dated Feb. 23, 2023, for U.S. Appl. No. 17/353,285, filed Jun. 21, 2021, 5 pages.
Sharma et al., "Microgrids: A New Approach To Supply-Side Design For Data Centers," 2009, 7 pages.
Yaramasu V., et al., "High-Power Wind Energy Conversion Systems: State-of-the-Art and Emerging Technologies", Proceedings of the IEEE, May 2015, vol. 103 (5), 49 pages.

* cited by examiner

METHOD AND SYSTEM FOR DYNAMIC POWER DELIVERY TO A FLEXIBLE GROWCENTER USING UNUTILIZED ENERGY SOURCES

CROSS REFERENCE TO RELATED APPLICATIONS

This application is a U.S. nationalization under 35 U.S.C. § 371 of International Application No. PCT/US2018/017955, filed Feb. 13, 2018, which claims the benefit of priority under 35 U.S.C. § 119(e) to U.S. Provisional Patent Application No. 62/616,348, filed Jan. 11, 2018. The disclosures set forth in the referenced applications are incorporated herein by reference in their entirety.

BACKGROUND OF THE INVENTION

Rapid population growth threatens to outpace food production, storage, and distribution capabilities. While modern agricultural practices have thus far allowed production to keep pace with population growth, the population is expected to swell to more than nine (9) billion by the year 2050. It is predicted that, by the year 2025, supply will no longer be able to meet demand. This anticipated food shortage is further complicated by the fact that large scale production farms produce the vast majority of food. As such, many regions rely completely on food produced in one location, stored in another, and distributed for local consumption. Storage and distribution logistics further complicate the delivery of fresh food and add additional cost. Thus, new agricultural practices are needed to address these issues as demand starts to outpace supply.

Shipping containers have been adapted for use in farming in non-traditional locations. Containers have successfully used in traditional agriculture, hydroponics, aquaculture, and aquaponics applications growing food, cash, plantation, and horticulture crops. A single 40-foot container can potentially yield the annual equivalent of three to five acres of farm land. The use of containers offers a number of unique advantages over conventional farming. Container farms are self-contained and modular, thereby allowing them to be built, transported, and situated where local demand exists. In addition, container farms allow farming to take place in locations and climates where farming otherwise wouldn't be viable due to climate, soil conditions, or water availability. Perhaps most importantly, because of their modularity, container farms allow production to scale. Containers may be stacked vertically on top of one another to minimize the footprint and maximize yield.

BRIEF SUMMARY OF THE INVENTION

According to one aspect of one or more embodiments of the present invention, a flexible growcenter includes a mobile container, a behind-the-meter power input system, a power distribution system, a growcenter control system, a climate control system, a lighting system, and an irrigation system. The growcenter control system modulates power delivery to one or more components of the climate control system, the lighting system, and the irrigation system based on unutilized behind-the-meter power availability or an operational directive.

According to one aspect of one or more embodiments of the present invention, a method of dynamic power delivery to a flexible growcenter using unutilized behind-the-meter power includes monitoring unutilized behind-the-meter power availability, determining when a growcenter ramp-up condition is met, and enabling behind-the-meter power delivery to one or more computing systems when the growcenter ramp-up condition is met.

Other aspects of the present invention will be apparent from the following description and claims.

DETAILED DESCRIPTION OF THE INVENTION

Figure 1:
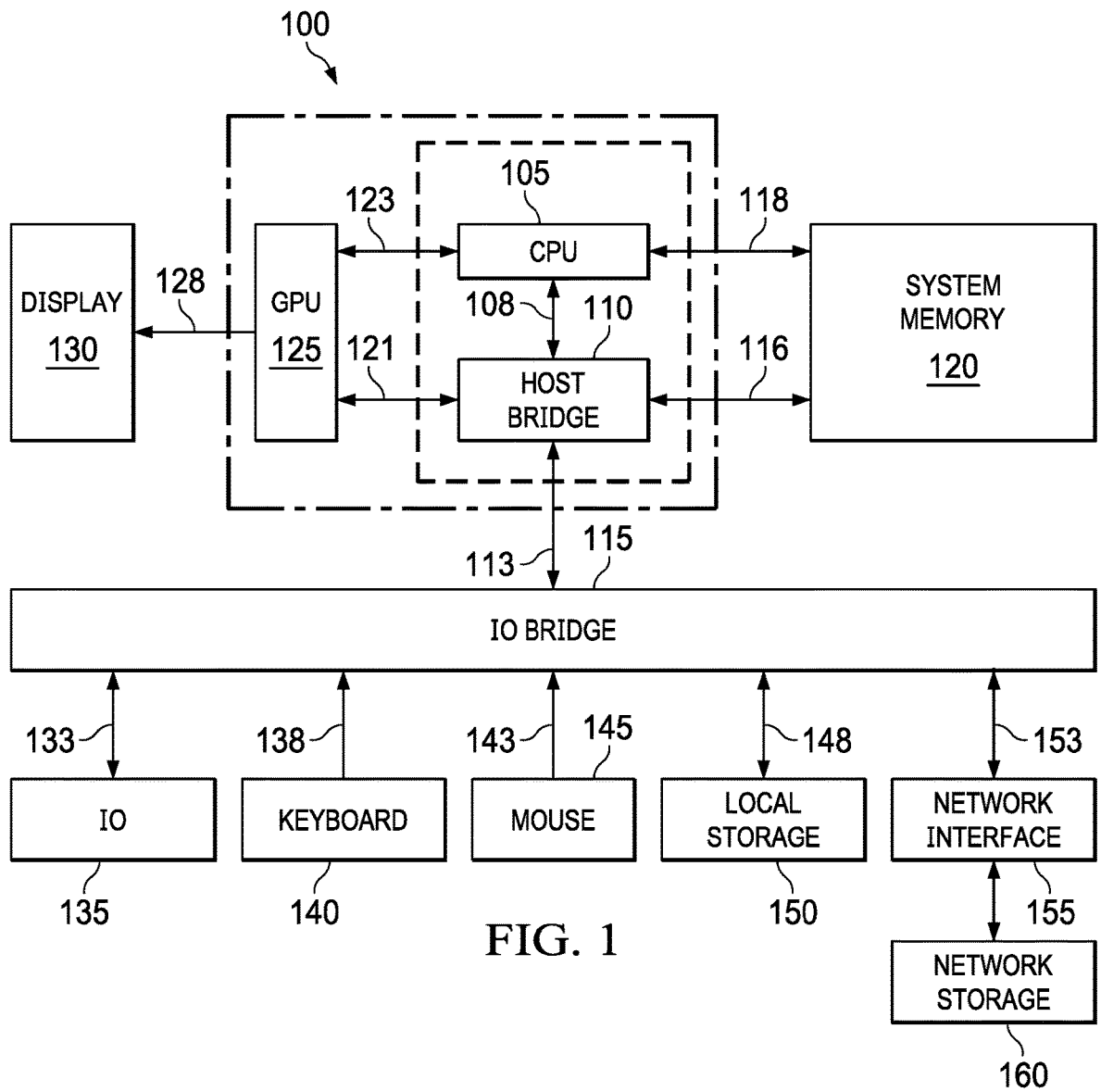
FIG. 1 shows a computing system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one having ordinary skill in the art are not described to avoid obscuring the description of the present invention.

The modular and scalable nature of container farms provides significant advantage in that they may be located on site near consumption and production may be scaled based on demand. The largest operational cost of a container farm is power. As container farms scale, the power consumption of each container becomes increasingly important. Each container typically includes a climate control system, an irrigation system, and a lighting system, as well as others systems that may be critical to its function, each of which consume power. While advancements have been made to reduce the power consumption of these systems, perhaps most notably, the use of light emitting diode ("LEI") lighting systems, the power consumption remains significant and more so as the container farm scales up in size. As such, one of the greatest impediments to the widespread adoption of container farms is the cost prohibitive nature of providing power.

Accordingly, in one or more embodiments of the present invention, a method and system for dynamic power delivery to a flexible growcenter uses unutilized behind-the-meter power sources without transmission and distribution costs. The flexible growcenter may be configured to modulate power delivery to one or more components of the climate control system, an irrigation system, or a lighting system based on the availability of unutilized behind-the-meter power or an operational directive. For example, the flexible growcenter may ramp-up to a fully online status, ramp-down to a fully offline status, or dynamically adjust power consumption, act a load balancer, or adjust the power factor based on which systems, or subsystems thereof, receive power. Advantageously, the flexible growcenter may allow localized farm operations to be performed with little to no energy costs, using clean and renewable energy that would otherwise be wasted.

FIG. 1 shows a computing system 100 in accordance with one or more embodiments of the present invention. Computing system 100 may include one or more central processing units (singular "CPU" or plural "CPUs") 105, host bridge 110, input/output ("IO") bridge 115, graphics processing units (singular "GPU" or plural "GPUs") 125, and/or application-specific integrated circuits (singular "ASIC or plural "ASICs") (not shown) disposed on one or more printed circuit boards (not shown) that are configured to perform computational operations. Each of the one or more CPUs 105, GPUs 125, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 105 may be a general purpose computational device typically configured to execute software instructions. CPU 105 may include an interface 108 to host bridge 110, an interface 118 to system memory 120, and an interface 123 to one or more IO devices, such as, for example, one or more GPUs 125. GPU 125 may serve as a specialized computational device typically configured to perform graphics functions related to frame buffer manipulation. However, one of ordinary skill in the art will recognize that GPU 125 may be used to perform non-graphics related functions that are computationally intensive. In certain embodiments, GPU 125 may interface 123 directly with CPU 125 (and interface 118 with system memory 120 through CPU 105), In other embodiments, GPU 125 may interface 121 with host bridge 110 (and interface 116 or 118 with system memory 120 through host bridge 110 or CPU 105 depending on the application or design). In still other embodiments, GPU 125 may interface 133 with IO bridge 115 (and interface 116 or 118 with system memory 120 through host bridge 110 or CPU 105 depending on the application or design). The functionality of GPU 125 may be integrated, in whole or in part, with CPU 105.

Host bridge 110 may be an interface device configured to interface between the one or more computational devices and IO bridge 115 and, in some embodiments, system memory 120. Host bridge 110 may include an interface 108 to CPU 105, an interface 113 to IO bridge 115, for embodiments where CPU 105 does not include an interface 118 to system memory 120, an interface 116 to system memory 120, and for embodiments where CPU 105 does not include an integrated GPU 125 or an interface 123 to GPU 125, an interface 121 to GPU 125. The functionality of host bridge 110 may be integrated, in whole or in part, with CPU 105. IO bridge 115 may be an interface device configured to interface between the one or more computational devices and various IO devices (e.g., 140, 145) and K) expansion, or add-on, devices (not independently illustrated). IO bridge 115 may include an interface 113 to host bridge 110, one or more interfaces 133 to one or more IO expansion devices 135, an interface 138 to keyboard 140, an interface 143 to mouse 145, an interface 148 to one or more local storage devices 150, and an interface 153 to one or more network interface devices 155. The functionality of JO bridge 115 may be integrated, in whole or in part, with CPU 105 or host bridge 110. Each local storage device 150, if any, may be a solid-state memory device, a solid-state memory device array, a hard disk drive, a hard disk drive array, or any other non-transitory computer readable medium. Network interface device 155 may provide one or more network interfaces including any network protocol suitable to facilitate networked communications.

Computing system 100 may include one or more network-attached storage devices 160 in addition to, or instead of, one or more local storage devices 150. Each network-attached storage device 160, if any, may be a solid-state memory device, a solid-state memory device array, a hard disk drive, a hard disk drive array, or any other non-transitory computer readable medium. Network-attached storage device 160 may or may not be collocated with computing system 100 and may be accessible to computing system 100 via one or more network interfaces provided by one or more network interface devices 155.

One of ordinary skill in the art will recognize that computing system 100 may be a conventional computing system or an application-specific computing system. In certain embodiments, an application-specific computing system may include one or more ASICs (not shown) that are configured to perform one or more functions in a more efficient manner. The one or more ASICs (not shown) may interface directly with CPU 105, host bridge 110, or GPU 125 or interface through JO bridge 115. Alternatively, in other embodiments, an application-specific computing system may be reduced to only those components necessary to perform a desired function in an effort to reduce one or more of chip count, printed circuit board footprint, thermal design power, and power consumption. The one or more ASICs (not shown) may be used instead of one or more of CPU 105, host bridge 110, IO bridge 115, or GPU 125. In such systems, the one or more ASICs may incorporate sufficient functionality to perform certain network and computational functions in a minimal footprint with substantially fewer component devices.

As such, one of ordinary skill in the art will recognize that CPU 105, host bridge 110, IO bridge 115, GPU 125, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 100 is merely exemplary and not intended to limit the type, kind, or configuration of component devices that constitute a computing system 100 suitable for performing computing operations in accordance with one or more embodiments of the present invention.

One of ordinary skill in the art will recognize that computing system 100 may be a stand alone, laptop, desktop, server, blade, or rack mountable system and may vary based on an application or design.

Figure 2:
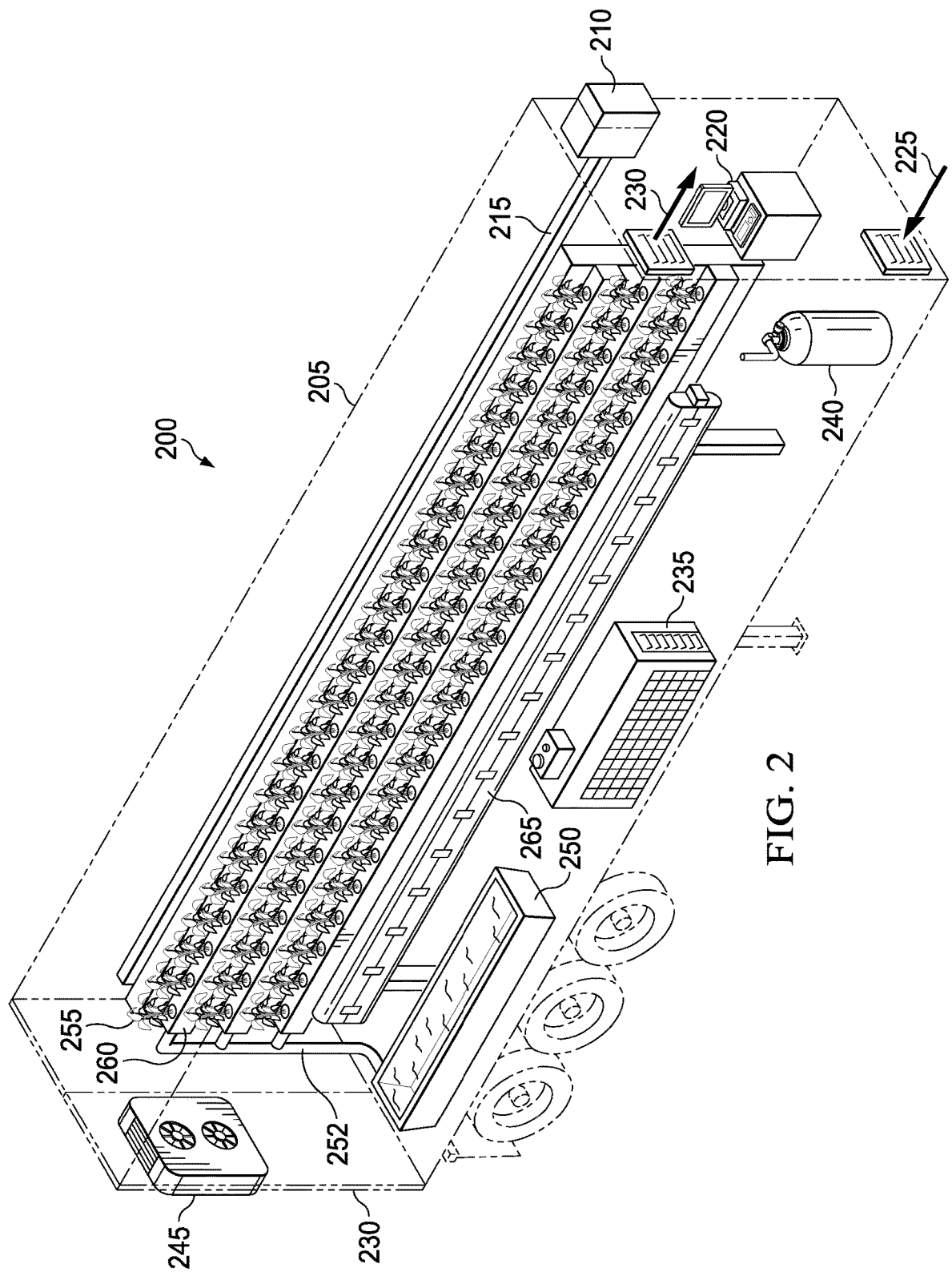
FIG. 2 shows a flexible growcenter in accordance with one or more embodiments of the present invention.

FIG. 2 shows a flexible growcenter 200 in accordance with one or more embodiments of the present invention. Flexible growcenter 200 may include a mobile container 205, a behind-the-meter power input system 210, a power distribution system 215, a growcenter control system 220, a climate control system (e.g., 225, 230, 235, 240, and/or 245), an irrigation system (e.g., 250 and 252), a plurality of plants 255 disposed in a plurality of grow containers 260, and a lighting system 265.

Growcenter control system 220 may be a computing system (e.g., 100 of FIG. 1) configured to dynamically modulate power delivery to one or more components of the climate control system (e.g., 235, 240, and/or 245), the irrigation system (e.g., 252), and lighting system 265 disposed within flexible growcenter 200 based on unutilized behind-the-meter power availability or an operational directive from a local station control system (not shown), a remote master control system (not shown), or a grid operator (not shown).

In certain embodiments, mobile container 205 may be a storage trailer disposed on wheels and configured for rapid deployment. In other embodiments, mobile container 205 may be a storage container (not shown) configured for placement on the ground and potentially stacked in a vertical manner (not shown). In still other embodiments, mobile container 205 may be an inflatable container, a floating container, or any other type or kind of container suitable for housing a mobile growcenter 200.

Flexible growcenter 200 may be rapidly deployed on site near a source of unutilized behind-the-meter power generation. Behind-the-meter power input system 210 may be configured to input power to flexible growcenter 200. Behind-the-meter power input system 210 may include a first input (not independently illustrated) configured to receive three-phase behind-the-meter alternating current ("AC") voltage. In certain embodiments, behind-the-meter power input system 210 may include a supervisory AC-to-AC step-down transformer (not shown) configured to step down three-phase behind-the-meter AC voltage to single-phase supervisory nominal AC voltage or a second input (not independently illustrated) configured to receive single-phase supervisory nominal AC voltage from the local station (not shown) or a metered source (not shown). Behind-the-meter power input system 210 may provide single-phase supervisory nominal AC voltage to growcenter control system 220, which may remain powered at almost all times to control the operation of flexible growcenter 200. The first input (not independently illustrated) or a third input (not independently illustrated) of behind-the-meter power input system 210 may direct three-phase behind-the-meter AC voltage to an operational AC-to-AC step-down transformer (not shown) configured to controllably step down three-phase behind-the-meter AC voltage to three-phase nominal AC voltage. Growcenter control system 220 may controllably enable or disable generation or provision of three-phase nominal AC voltage by the operational AC-to-AC step-down transformer (not shown).

Behind-the-meter power input system 210 may provide three phases of three-phase nominal AC voltage to power distribution system 215. Power distribution system 215 may controllably provide a single phase of three-phase nominal AC voltage to components of the climate control system (e.g., 235, 240, and/or 245), the irrigation system (e.g., 252), and subsets of lights (not independently illustrated) of lighting system 265 disposed within flexible growcenter 200. Growcenter control system 220 may controllably select which phase of three-phase nominal AC voltage that power distribution system 215 provides to components of the climate control system (e.g., 235, 240, and/or 245), the irrigation system (e.g., 252), and one or more lights (not independently illustrated) of lighting system 265. In this way, growcenter control system 220 may modulate power delivery by either ramping-up flexible growcenter 200 to fully operational status, ramping-down flexible growcenter 200 to offline status (where only growcenter control system 220 remains powered), reducing power consumption by withdrawing power delivery from, or reducing power to, one or more components of the climate control system (e.g., 23, 240, and/or 245), the irrigation system (e.g., 252), and lights (not independently illustrated) of lighting system 265, or modulating a power factor correction factor for the local station by controllably adjusting which phases of three-phase nominal AC voltage are used by one or more components of the climate control system (e.g., 235, 240, and/or 245), the irrigation system (e.g., 252), and lights (not independently illustrated) of lighting system 265.

Flexible growcenter 200 may include a climate control system (e.g., 225, 230, 235, 240, and/or 245) configured to maintain the climate within container 205. In certain embodiments, the climate control system may include an air intake 225, an air outtake 230, a humidity control system 235, a gas system 240, and an air conditioner/heater 245, each of which may be independently powered, with a single phase of three-phase nominal AC voltage for maximum flexibility. Humidity control system 235 may, under the direction of growcenter computing system 220 or based on one or more sensors (not independently illustrated), regulate the relative humidity within container 205 to control the transpiration of the plants 255. Gas system 240 may, under the direction of growcenter computing system 220 or based on one or more sensors (not independently illustrated), regulate the release of one or more gases, such as, for example, carbon dioxide, $CO_2$, that, with light and nutrients, aid the plants 255 in photosynthesis. Air conditioner/heater 245 may be used to control the temperature within container 205. The enclosure of container 205, as well as the use of heat generating lights 265, tends to increase the ambient temperature within container 205, which damages plants 255. In warm climates, air conditioner 245 may be configured to lower the temperature within container 205 to a temperature suitable for growth of the plants 255. In cold climates, heater 245 may be configured to raise the temperature within container 205 to a temperature suitable for growth of the plants 255.

The irrigation system may include a water tank 250, a pump system (not independently illustrated), and a plurality of irrigation lines 252 that provide water to plants 255. The pump system (not independently illustrated) may be powered by a single phase of three-phase nominal AC voltage. Lighting system 265 may include a plurality of lights (not independently illustrated) that provide light for photosynthesis. Each light (not independently illustrated) or group of lights (not independently illustrated) of lighting system 265 may be powered by a single phase of three-phase nominal AC voltage. Lighting system 265 may, under direction of growcenter computing system 220, control the on or off state of one or more lights (not independently illustrated) or groups of lights (not independently illustrated) of lighting system 265. The lights (not independently illustrated) may be fluorescent, high intensity discharge ("HID"), or LED lights. Because the lighting system 265 tends to work antagonistically with the climate control system (e.g., 225, 230, 235, 240, and/or 245), the modern trend is to use LED lights. However, one of ordinary skill in the art will recognize that the type of lights used may vary based on an application or design.

Flexible growcenter 200 may include a battery system (not shown) configured to convert three-phase nominal AC voltage to nominal DC voltage and store power in a plurality of storage cells. The battery system (not shown) may include a DC-to-AC inverter configured to convert nominal DC voltage to three-phase nominal AC voltage for flexible growcenter 200 use. Alternatively, the battery system (not shown) may include a DC-to-AC inverter configured to convert nominal DC voltage to single-phase nominal AC voltage to power growcenter control system 220.

One of ordinary skill in the art will recognize that a voltage level of three-phase behind-the-meter AC voltage may vary based on an application or design and the type or kind of local power generation. As such, a type, kind, or configuration of the operational AC-to-AC step down transformer (not shown) may vary based on the application or design. In addition, the frequency and voltage level of three-phase nominal AC voltage, single-phase nominal AC voltage, and nominal DC voltage may vary based on the application or design in accordance with one or more embodiments of the present invention.

Figure 3:
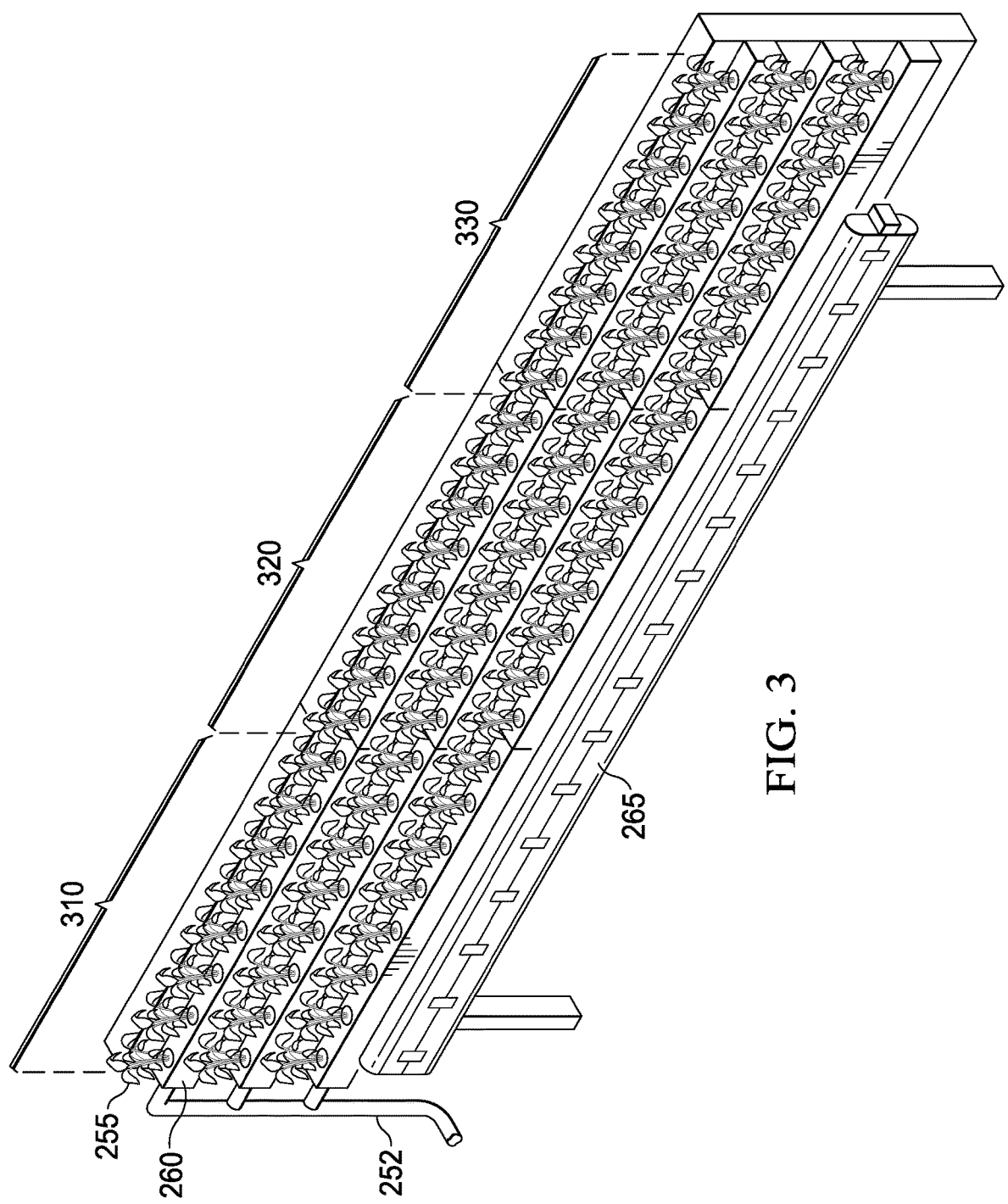
FIG. 3 shows a three-phase power distribution of a flexible growcenter in accordance with one or more embodiments of the present invention.

FIG. 3 shows a three-phase power distribution of a flexible growcenter 200 in accordance with one or more embodiments of the present invention. Flexible growcenter 200 may include a plurality of plants 255 disposed within a plurality of containers 260. As discussed above, the behind-the-meter power input system (210 of FIG. 2) may provide three phases of three-phase nominal AC voltage to the power distribution system (215 of FIG. 2), The power distribution system (215 of FIG. 2) may controllably provide a single phase of three-phase nominal AC voltage to one or more components of the climate control system (e.g., 235, 240, and/or 245), the pump system (e.g., pump for 252) that drives water through the irrigation lines 252 of the irrigation system to one or more plants 255, and one or more lights (not independently illustrated) of the lighting system 265 disposed within flexible growcenter 200. For example, for purposes of illustration only, a flexible growcenter 200 may include three groups (e.g., 310, 320, and 330) of plants 255, each of which may have one or more independently controlled lights (not independently illustrated) of the lighting system 265 and the pump system (not independently illustrated) that drives one or more irrigation lines 252. The power distribution system (215 of FIG. 2) may control which phase of three-phase nominal AC voltage is provided to the one or more lights (not independently illustrated) of the lighting system 265 and the pump system (not independently illustrated) that drives one or more irrigation lines 252.

In the figure, for purposes of illustration only, the plurality of plants 255 disposed in the plurality of containers 260 may be divided into a first group 310, a second group 320, and a third group 330, where each group includes a subset of lights (not independently illustrated) of lighting system 265, and potentially other components such as, for example, the pumping system (not independently illustrated) that drives one or more irrigation lines 252. The power distribution system (215 of FIG. 2) may, for example, provide a first phase of three-phase nominal AC voltage to the first group 310, a second phase of three-phase nominal AC voltage to the second group 320, and a third phase of three-phase nominal AC voltage to the third group 330. If the flexible growcenter (200 of FIG. 2) receives an operational directive from the local station (not shown) to provide power factor correction, the growcenter control system (220 of FIG. 2) may direct the power distribution system (215 of FIG. 2) to adjust which phase or phases of three-phase nominal AC voltage are used to provide the power factor correction required by the local station (not shown) or grid operator (not shown). One of ordinary skill in the art will recognize that, in addition to the power distribution, the load may be varied by adjusting the number of groups operatively powered. As such, the flexible growcenter (200 of FIG. 2) may be configured to act as a capacitive or inductive load to provide the appropriate reactance necessary to achieve the power factor correction required by the local station (not shown).

Figure 4:
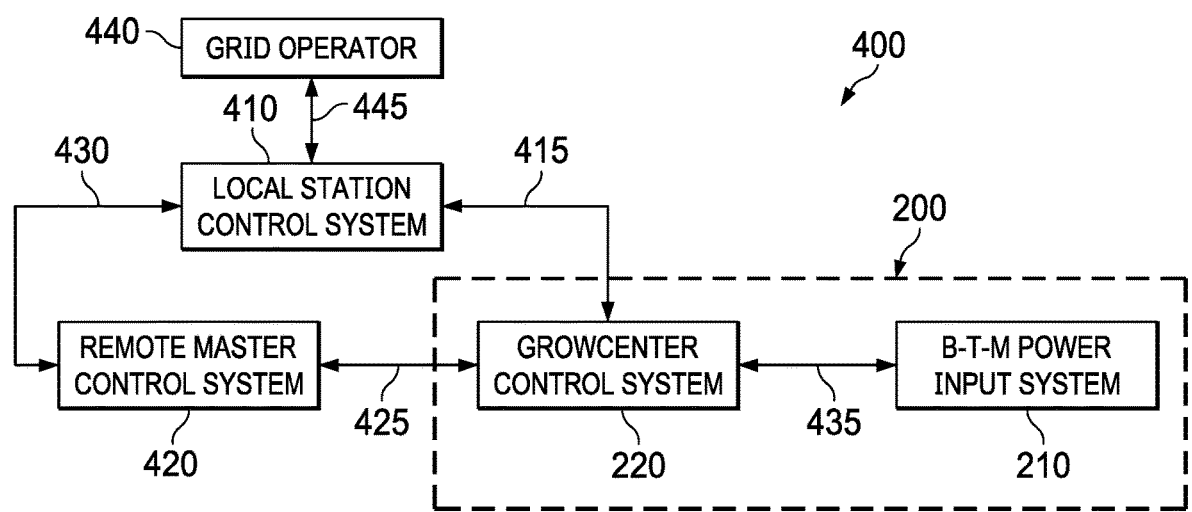
FIG. 4 shows a control distribution scheme of a flexible growcenter in accordance with one or more embodiments of the present invention.

FIG. 4 shows a control distribution scheme of a flexible growcenter 200 in accordance with one or more embodiments of the present invention. Growcenter control system 220 may independently, or cooperatively with one or more of local station control system 410, remote master control system 420, and grid operator 440, modulate power delivery to flexible growcenter 200. Specifically, power delivery may be dynamically adjusted based on conditions or operational directives.

Local station control system 410 may be a computing system (e.g., 100 of FIG. 1) that is configured to control various aspects of the local station (not independently illustrated) that generates power and sometimes generates unutilized behind-the-meter power. Local station control system 410 may communicate with remote master control system 420 over a networked connection 430 and with growcenter control system 220 over a networked or hardwired connection 415. Remote master control system 420 may be a computing system (e.g., 100 of FIG. 1) that is located offsite, but connected via a network connection 425 to growcenter control system 220, that is configured to provide supervisory or override control of flexible growcenter 200 or a fleet (not shown) of flexible growcenters 200. Grid operator 440 may be a computing system (e.g., 100 of FIG. 1) that is configured to control various aspects of the grid (not independently illustrated) that receives power from the local station (not independently illustrated). Grid operator 440 may communicate with local station control system 440 over a networked or hardwired connection 445.

Growcenter control system 220 may monitor unutilized behind-the-meter power availability at the local station (not independently illustrated) and determine when a growcenter ramp-up condition is met. Unutilized behind-the-meter power availability may include one or more of excess local power generation, excess local power generation that the grid cannot accept, local power generation that is subject to economic curtailment, local power generation that is subject to reliability curtailment, local power generation that is subject to power factor correction, situations where local power generation is prohibitively low, start up situations, transient situations, or testing situations where there is an economic advantage to using locally generated behind-the-meter power generation, specifically power available at little to no cost and with no associated transmission or distribution costs.

The growcenter ramp-up condition may be met if there is sufficient behind-the-meter power availability and there is no operational directive from local station control system 410, remote master control system 420, or grid operator 440 to go offline or reduce power. As such, growcenter control system 220 may enable 435 behind-the-meter power input system 210 to provide three-phase nominal AC voltage to the power distribution system (215 of FIG. 2) to power one or more components of the climate control system (e.g., 235, 240, and/or 245), the irrigation system (e.g., 252), and lighting system 265 or a subset thereof.

Remote master control system 420 may specify to growcenter control system 220 what sufficient behind-the-meter power availability constitutes, or growcenter control system 220 may be programmed with a predetermined preference or criteria on which to make the determination independently. For example, in certain circumstances, sufficient behind-the-meter power availability may be less than that required to fully power the entire flexible growcenter 200. In such circumstances, growcenter control system 220 may provide power to only a subset of one or more components of the climate control system (e.g., 235, 240, and/or 245), the irrigation system (e.g., 252), and lighting system 265, that is within the sufficient, but less than full, range of power that is available.

While flexible growcenter 200 is online and operational, a growcenter ramp-down condition may be met when there is insufficient, or anticipated to be insufficient, behind-the-meter power availability or there is an operational directive from local station control system 410, remote master control system 420, or grid operator 440. Growcenter control system 220 may monitor and determine when there is insufficient, or anticipated to be insufficient, behind-the-meter power availability. As noted above, sufficiency may be specified by remote master control system 420 or growcenter control system 220 may be programmed with a predetermined preference or criteria on which to make the determination independently. An operational directive may be based on current dispatchability, forward looking forecasts for when unutilized behind-the-meter power is, or is expected to be, available, economic considerations, reliability considerations, operational considerations, or the discretion of the local station 410, remote master control 420, or grid operator 440. For example, local station control system 410, remote master control system 420, or grid operator 440 may issue an operational directive to flexible growcenter 200 to go offline and power down. When the growcenter ramp-down condition is met, growcenter control system 220 may disable power delivery to one or more components of the climate control system (e.g., 235, 240, and/or 245), the irrigation system (e.g., 252), and lighting system 265. Growcenter control system 220 may disable 435 behind-the-meter power input system 210 from providing three-phase nominal AC voltage to the power distribution system (215 of FIG. 2) to power down the one or more components of the climate control system (e.g., 235, 240, and/or 245), the irrigation system (e.g., 252), and lighting system 265, while growcenter control system 220 remains powered and is capable of rebooting flexible growcenter 200 when unutilized behind-the-meter power becomes available again.

While flexible growcenter 200 is online and operational, changed conditions or an operational directive may cause growcenter control system 220 to modulate power consumption by flexible growcenter 200. Growcenter control system 220 may determine, or local station control system 410, remote master control system 420, or grid operator 440 may communicate, that a change in local conditions may result in less power generation, availability, or economic feasibility, than would be necessary to fully power flexible growcenter 200. In such situations, growcenter control system 220 may take steps to reduce or stop power consumption by flexible growcenter 200 (other than that required to maintain operation of growcenter control system 220). Alternatively, local station control system 410, remote master control system 420, or grid operator 440, may issue an operational directive to reduce power consumption for any reason, the cause of which may be unknown. In response, growcenter control system 220 may dynamically reduce or withdraw power delivery to one or more components of the climate control system (e.g., 235, 240, and/or 245), the irrigation system (e.g., 252), and lighting system 265 to meet the dictate. Growcenter control system 220 may controllably provide three-phase nominal AC voltage to a smaller subset of one or more components of the climate control system (e.g., 235, 240, and/or 245), the irrigation system (e.g., 252), and lighting system 265 to reduce power consumption.

Figure 5:
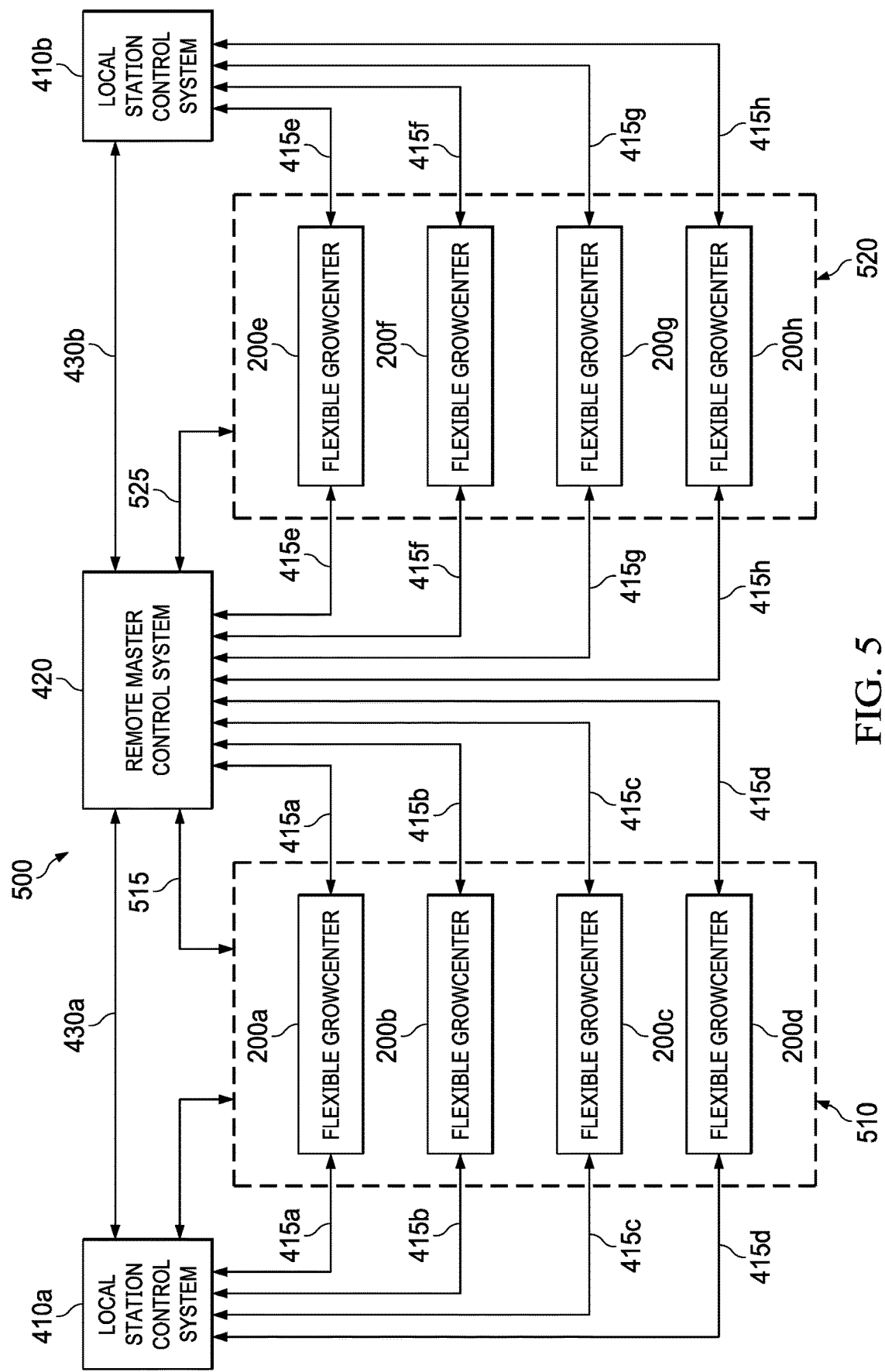
FIG. 5 shows a control distribution scheme of a fleet of flexible growcenters in accordance with one or more embodiments of the present invention.

FIG. 5 shows a control distribution of a fleet 500 of flexible growcenters 200 in accordance with one or more embodiments of the present invention. The control distribution of a flexible growcenter 200 shown and described with respect to FIG. 4 may be extended to a fleet 500 of flexible growcenters 200. For example, a first local station (not independently illustrated), such as, for example, a wind farm (not shown), may include a first plurality 510 of flexible growcenters 200a through 200d, which may be collocated or distributed across the local station (not shown). A second local station (not independently illustrated), such as, for example, another wind farm or a solar farm (not shown), may include a second plurality 520 of flexible growcenters 200e through 200h, which may be collocated or distributed across the local station (not shown). One of ordinary skill in the art will recognize that the number of flexible growcenters 200 deployed at a given station and the number of stations within the fleet 500 may vary based on an application or design in accordance with one or more embodiments of the present invention.

Remote master control system 420 may provide supervisory control over fleet 500 of flexible growcenters 200 in a similar manner to that shown and described with respect to FIG. 4, with the added flexibility to make high level decisions with respect to fleet 500 that may be counterintuitive to a given station. Remote master control system 420 may make decisions regarding the issuance of operational directives to a given local station based on, for example, the status of each local station where flexible growcenters 200 are deployed.

Figure 6:
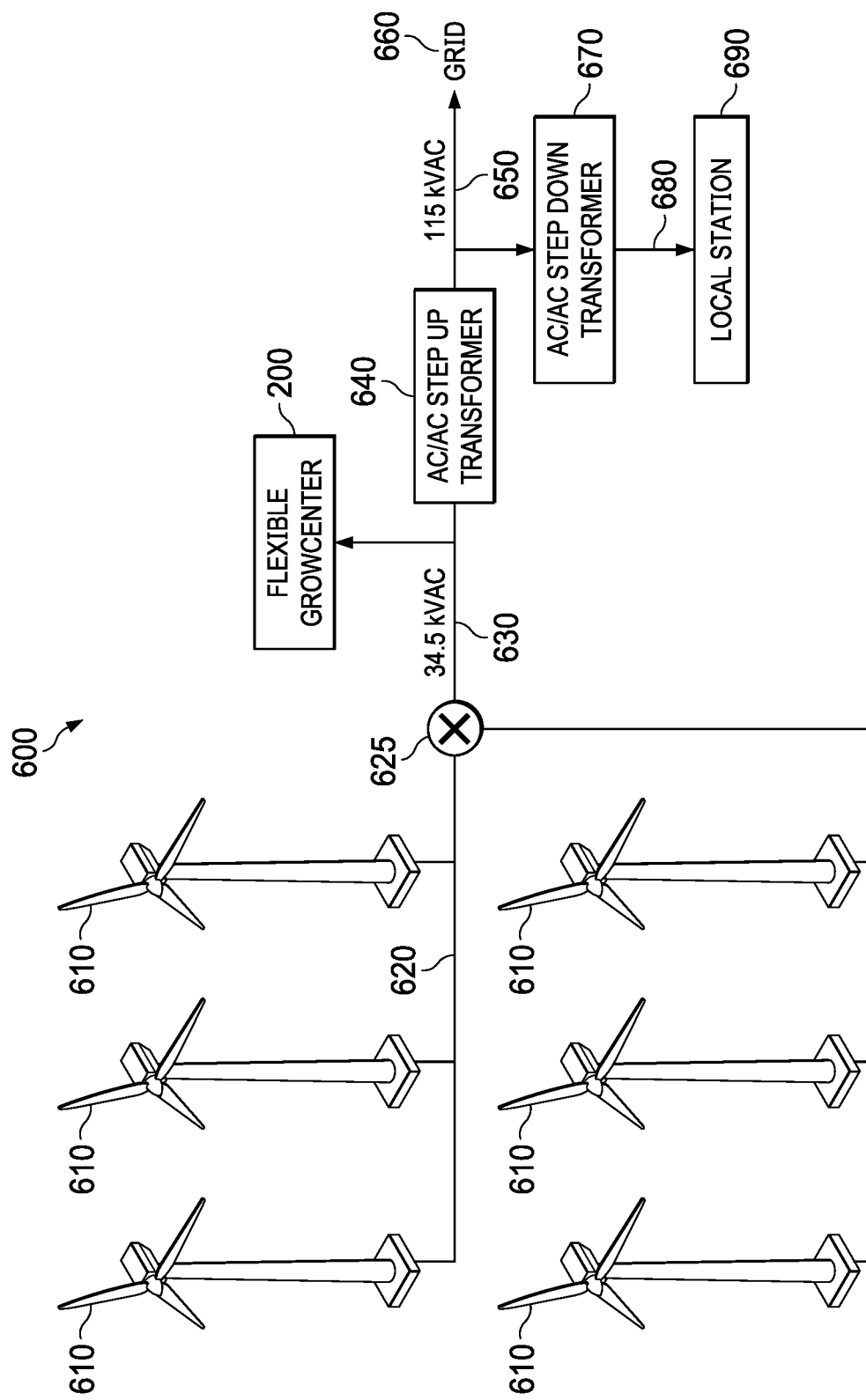
FIG. 6 shows a flexible growcenter powered by one or more wind turbines in accordance with one or more embodiments of the present invention.

FIG. 6 shows a flexible growcenter 200 powered by one or more wind turbines 610 in accordance with one or more embodiments of the present invention. A wind farm 600 typically includes a plurality of wind turbines 610, each of which intermittently generates a wind-generated AC voltage. The wind-generated AC voltage may vary based on a type, kind, or configuration of farm 600, turbine 610, and incident wind speed. The wind-generated AC voltage is typically input into a turbine AC-to-AC step-up transformer (not shown) that is disposed within the nacelle (not independently illustrated) or at the base of the mast (not independently illustrated) of turbine 610. The turbine AC-to-AC step up transformer (not shown) outputs three-phase wind-generated AC voltage 620. Three-phase wind-generated AC voltage 620 produced by the plurality of wind turbines 610 is collected 625 and provided 630 to another AC-to-AC step-up transformer 640 that steps up three-phase wind-generated AC voltage 620 to three-phase grid AC voltage 650 suitable for delivery to grid 660. Three-phase grid AC voltage 650 may be stepped down with an AC-to-AC step-down transformer 670 configured to produce three-phase local station AC voltage 680 provided to local station 690. One of ordinary skill in the art will recognize that the actual voltage levels may vary based on the type, kind, or number of wind turbines 610, the configuration or design of wind farm 600, and grid 660 that it feeds into.

The output side of AC-to-AC step-up transformer 640 that connects to grid 660 may be metered and is typically subject to transmission and distribution costs. In contrast, power consumed on the input side of AC-to-AC step-up transformer 640 may be considered behind-the-meter and is typically not subject to transmission and distribution costs. As such, one or more flexible growcenters 200 may be powered by three-phase wind-generated AC voltage 620. Specifically, in wind farm 600 applications, the three-phase behind-the-meter AC voltage used to power flexible growcenter 200 may be three-phase wind-generated AC voltage 620. As such, flexible growcenter 200 may reside behind-the-meter, avoid transmission and distribution costs, and may be dynamically powered when unutilized behind-the-meter power is available.

Unutilized behind-the-meter power availability may occur when there is excess local power generation. In high wind conditions, wind farm 600 may generate more power than, for example, AC-to-AC step-up transformer 640 is rated for. In such situations, wind farm 600 may have to take steps to protect its equipment from damage, which may include taking one or more turbines 610 offline or shunting their voltage to dummy loads or ground. Advantageously, one or more flexible growcenters 200 may be used to consume power on the input side of AC-to-AC step-up transformer 640, thereby allowing wind farm 600 to operate equipment within operating ranges while flexible growcenter 200 receives behind-the-meter power without transmission or distribution costs. The local station control system (not independently illustrated) of local station 690 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote mater control system (420 of FIG. 4) may determine how to power each individual flexible growcenter 200 in accordance with the operational directive or provide an override to each flexible growcenter 200.

Another example of unutilized behind-the-meter power availability is when grid 660 cannot, for whatever reason, take the power being produced by wind farm 600. In such situations, wind farm 600 may have to take one or more turbines 610 offline or shunt their voltage to dummy loads or ground. Advantageously, one or more flexible growcenters 200 may be used to consume power on the input side of AC-to-AC step-up transformer 640, thereby allowing wind farm 600 to either produce power to grid 660 at a lower level or shut down transformer 640 entirely while flexible growcenter 200 receives behind-the-meter power without transmission or distribution costs. The local station control system (not independently illustrated) of local station 690 or the grid operator (not independently illustrated) of grid 660 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Another example of unutilized behind-the-meter power availability is when wind farm 600 is selling power to grid 660 at a negative price that is offset by a production tax credit. In certain circumstances, the value of the production tax credit may exceed the price wind farm 600 would have to pay to grid 660 to offload their generated power. Advantageously, one or more flexible growcenters 200 may be used to consume power behind-the-meter, thereby allowing wind farm 600 to produce and obtain the production tax credit, but sell less power to grid 660 at the negative price. The local station control system (not independently illustrated) of local station 690 may issue an operational directive to the one or more flexible growcenters 200 or to the remote master control system (420 of FIG. 4) to ramp-up to the desired power consumption level. When the operational directive requires the cooperative action of multiple flexible growcenter 200, the remote master control system (420 of FIG. 4) may determine how to power each individual flexible growcenter 200 in accordance with the operational directive or provide an override to each flexible growcenter 200.

Another example of unutilized behind-the-meter power availability is when wind farm 600 is selling power to grid 660 at a negative price because grid 660 is oversupplied or is instructed to stand down and stop producing altogether. The grid operator (not independently illustrated) may select certain power generation stations to go offline and stop producing power to grid 660. Advantageously, one or more flexible growcenters 200 may be used to consume power behind-the-meter, thereby allowing wind farm 600 to stop producing power to grid 660, but making productive use of the power generated behind-the-meter without transmission or distribution costs. The local station control system (not independently illustrated) of the local station 690 or the grid operator (not independently illustrated) of grid 660 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Another example of unutilized behind-the-meter power availability is when wind farm 600 is producing power to grid 660 that is unstable, out of phase, or at the wrong frequency, or grid 660 is already unstable, out of phase, or at the wrong frequency for whatever reason. The grid operator (not independently illustrated) may select certain power generation stations to go offline and stop producing power to grid 660. Advantageously, one or more flexible growcenters 200 may be used to consume power behind-the-meter, thereby allowing wind farm 600 to stop producing power to grid 660, but make productive use of the power generated behind-the-meter without transmission or distribution costs. The local station control system (not independently illustrated) of local station 690 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Further examples of unutilized behind-the-meter power availability is when wind farm 600 experiences low wind conditions that make it not economically feasible to power up certain components, such as, for example, the local station (not independently illustrated), but there may be sufficient behind-the-meter power availability to power one or more flexible growcenters 200. Similarly, unutilized behind-the-meter power availability may occur when wind farm 600 is starting up, or testing, one or more turbines 610. Turbines 610 are frequently offline for installation, maintenance, and service and must be tested prior to coming online as part of the array. One or more flexible growcenters 200 may be powered by one or more turbines 610 that are offline from farm 600. The above-noted examples of when unutilized behind-the-meter power is available are merely exemplary and are not intended to limit the scope of what one of ordinary skill in the art would recognize as unutilized behind-the-meter power availability. Unutilized behind-the-meter power availability may occur anytime there is power available and accessible behind-the-meter that is not subject to transmission and distribution costs and there is an economic advantage to using it.

One of ordinary skill in the art will recognize that wind farm 600 and wind turbine 610 may vary based on an application or design in accordance with one or more embodiments of the present invention.

Figure 7:
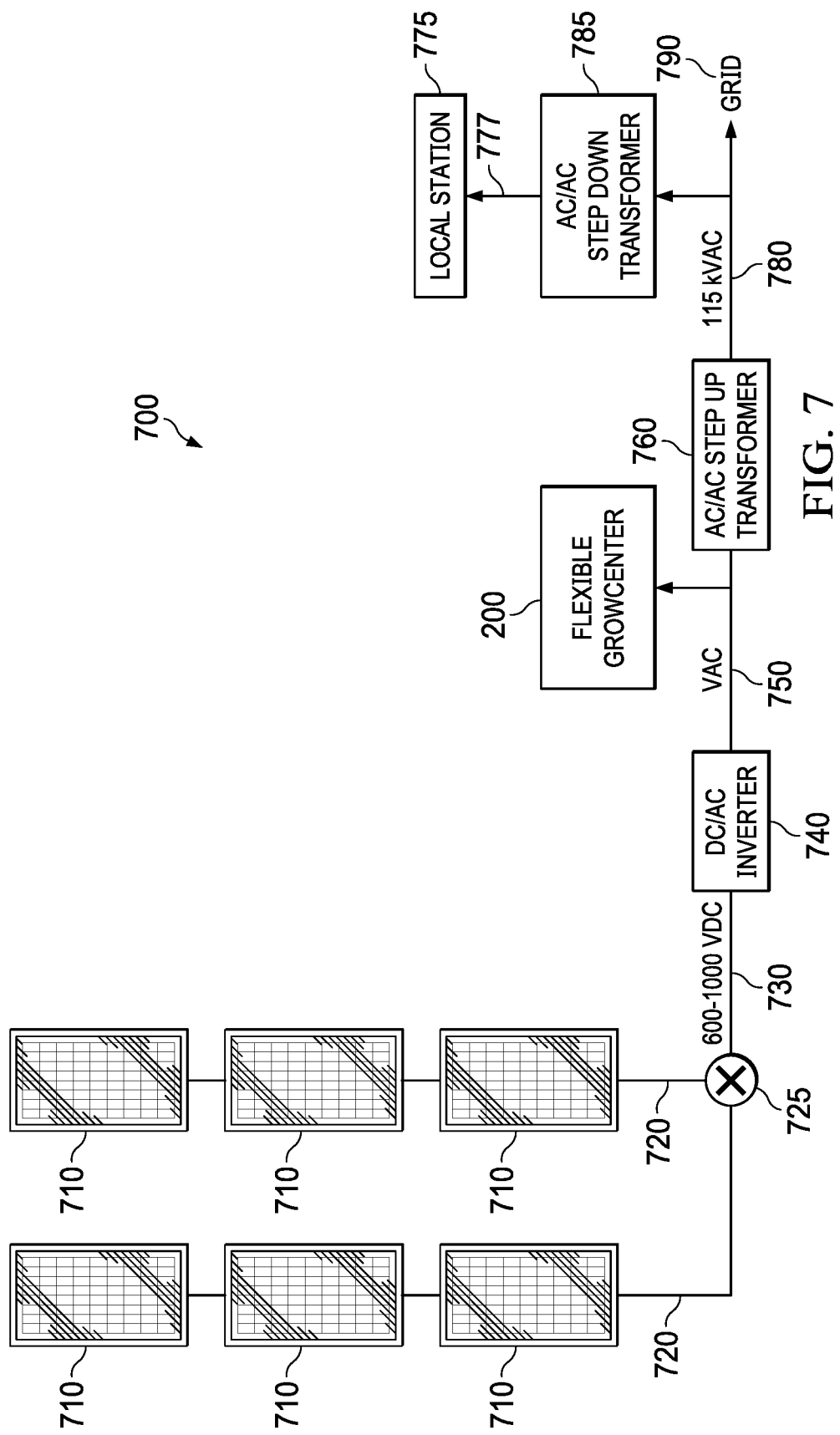
FIG. 7 shows a flexible growcenter powered by one or more solar panels in accordance with one or more embodiments of the present invention.

FIG. 7 shows a flexible growcenter 200 powered by one or more solar panels 710 in accordance with one or more embodiments of the present invention. A solar farm 700 typically includes a plurality of solar panels 710, each of which intermittently generates a solar-generated DC voltage 720. Solar-generated DC voltage 720 may vary based on a type, kind, or configuration of farm 700, panel 710, and incident sunlight. Solar-generated DC voltage 720 produced by the plurality of solar panels 710 is collected 725 and provided 730 to a DC-to-AC inverter that converts solar-generated DC voltage into three-phase solar-generated AC voltage 750, Three-phase solar-generated AC voltage 750 is provided to an AC-to-AC step-up transformer 760 that steps up three-phase solar-generated AC voltage to three-phase grid AC voltage 790. Three-phase grid AC voltage 790 may be stepped down with an AC-to-AC step-down transformer 785 configured to produce three-phase local station AC voltage 777 provided to local station 775. One of ordinary skill in the art will recognize that the actual voltage levels may vary based on the type, kind, or number of solar panels 710, the configuration or design of solar farm 700, and grid 790 that it feeds into.

The output side of AC-to-AC step-up transformer 760 that connects to grid 790 may be metered and is typically subject to transmission and distribution costs. In contrast, power consumed on the input side of AC-to-AC step-up transformer 760 may be considered behind-the-meter and is typically not subject to transmission and distribution costs. As such, one or more flexible growcenters 200 may be powered by three-phase solar-generated AC voltage 750. Specifically, in solar farm 700 applications, the three-phase behind-the-meter AC voltage used to power flexible growcenter 200 may be three-phase solar-generated AC voltage 750. As such, flexible growcenter 200 may reside behind-the-meter, avoid transmission and distribution costs, and may be dynamically powered when unutilized behind-the-meter power is available.

Unutilized behind-the-meter power availability may occur when there is excess local power generation. In high incident sunlight situations, solar farm 700 may generate more power than, for example, AC-to-AC step-up transformer 760 is rated for. In such situations, solar farm 700 may have to take steps to protect its equipment from damage, which may include taking one or more panels 710 offline or shunting their voltage to dummy loads or ground. Advantageously, one or more flexible growcenters 200 may be used to consume power on the input side of AC-to-AC step-up transformer 760, thereby allowing solar farm 700 to operate equipment within operating ranges while flexible growcenter 200 receives behind-the-meter power without transmission or distribution costs. The local station control system (not independently illustrated) of local station 775 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote mater control system (420 of FIG. 4) may determine how to power each individual flexible growcenter 200 in accordance with the operational directive or provide an override to each flexible growcenter 200.

Another example of unutilized behind-the-meter power availability is when grid 790 cannot, for whatever reason, take the power being produced by solar farm 700. In such situations, solar farm 700 may have to take one or more panels 710 offline or shunt their voltage to dummy loads or ground. Advantageously, one or more flexible growcenters 200 may be used to consume power on the input side of AC-to-AC step-up transformer 760, thereby allowing solar farm 700 to either produce power to grid 790 at a lower level or shut down transformer 760 entirely while flexible growcenter 200 receives behind-the-meter power without transmission or distribution costs. The local station control system (not independently illustrated) of local station 775 or the grid operator (not independently illustrated) of grid 790 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Another example of unutilized behind-the-meter power availability is when solar farm 700 is selling power to grid 790 at a negative price that is offset by a production tax credit. In certain circumstances, the value of the production tax credit may exceed the price solar farm 700 would have to pay to grid 790 to offload their generated power. Advantageously, one or more flexible growcenters 200 may be used to consume power behind-the-meter, thereby allowing solar farm 700 to produce and obtain the production tax credit, but sell less power to grid 790 at the negative price. The local station control system (not independently illustrated) of local station 775 may issue an operational directive to the one or more flexible growcenters 200 or to the remote master control system (420 of FIG. 4) to ramp-up to the desired power consumption level. When the operational directive requires the cooperative action of multiple flexible growcenter 200, the remote master control system (420 of FIG. 4) may determine how to power each individual flexible growcenter 200 in accordance with the operational directive or provide an override to each flexible growcenter 200.

Another example of unutilized behind-the-meter power availability is when solar farm 700 is selling power to grid 790 at a negative price because grid 790 is oversupplied or is instructed to stand down and stop producing altogether. The grid operator (not independently illustrated) may select certain power generation stations to go offline and stop producing power to grid 790. Advantageously, one or more flexible growcenters 200 may be used to consume power behind-the-meter, thereby allowing solar farm 700 to stop producing power to grid 790, but making productive use of the power generated behind-the-meter without transmission or distribution costs. The local station control system (not independently illustrated) of the local station 775 or the grid operator (not independently illustrated) of grid 790 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Another example of unutilized behind-the-meter power availability is when solar farm 700 is producing power to grid 790 that is unstable, out of phase, or at the wrong frequency, or grid 790 is already unstable, out of phase, or at the wrong frequency for whatever reason. The grid operator (not independently illustrated) may select certain power generation stations to go offline and stop producing power to grid 790. Advantageously, one or more flexible growcenters 200 may be used to consume power behind-the-meter, thereby allowing solar farm 700 to stop producing power to grid 790, but make productive use of the power generated behind-the-meter without transmission or distribution costs. The local station control system (not independently illustrated) of local station 775 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Further examples of unutilized behind-the-meter power availability is when solar farm 700 experiences intermittent cloud cover such that it is not economically, feasible to power up certain components, such as, for example local station 775, but there may be sufficient behind-the-meter power availability to power one or more flexible growcenters 200. Similarly, unutilized behind-the-meter power availability may occur when solar farm 700 is starting up, or testing, one or more panels 710. Panels 710 are frequently offline for installation, maintenance, and service and must be tested prior to coming online as part of the array. One or more flexible growcenters 200 may be powered by one or more panels 710 that are offline from farm 700. The above-noted examples of when unutilized behind-the-meter power is available are merely exemplary and are not intended to limit the scope of what one of ordinary skill in the art would recognize as unutilized behind-the-meter power availability. Behind-the-meter power availability may occur anytime there is power available and accessible behind-the-meter that is not subject to transmission and distribution costs and there is an economic advantage to using it.

One of ordinary skill in the art will recognize that solar farm 700 and solar panel 710 may vary based on an application or design in accordance with one or more embodiments of the present invention.

Figure 8:
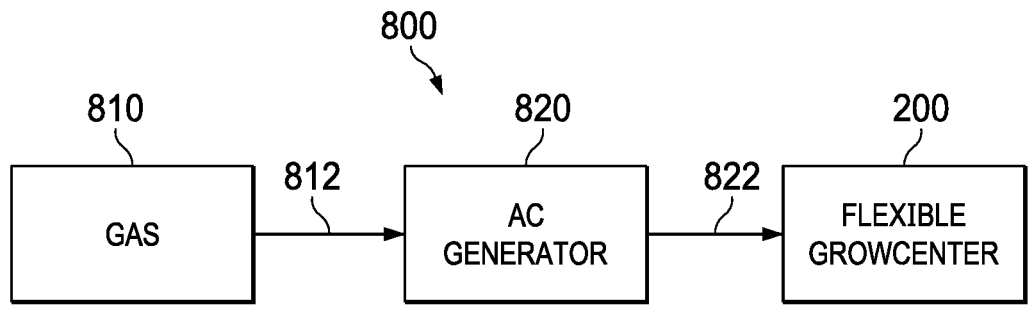
FIG. 8 shows a flexible growcenter powered by flare gas in accordance with one or more embodiments of the present invention.

FIG. 8 shows a flexible growcenter 200 powered by flare gas 800 in accordance with one or more embodiments of the present invention. Flare gas 800 is combustible gas produced as a product or by-product of petroleum refineries, chemical plants, natural gas processing plants, oil and gas drilling rigs, and oil and gas production facilities. Flare gas 800 is typically burned off through a flare stack (not shown) or vented into the air. In one or more embodiments of the present invention, flare gas 800 may be diverted 812 to a gas-powered generator that produces three-phase gas-generated AC voltage 822. This power may be considered behind-the-meter and is not subject to transmission and distribution costs. As such, one or more flexible growcenters 200 may be powered by three-phase gas-generated AC voltage, Specifically, the three-phase behind-the-meter AC voltage used to power flexible growcenter 200 may be three-phase gas-generated AC voltage 822. Accordingly, flexible growcenter 200 may reside behind-the-meter, avoid transmission and distribution costs, and may be dynamically powered when unutilized behind-the-meter power is available.

Figure 9:
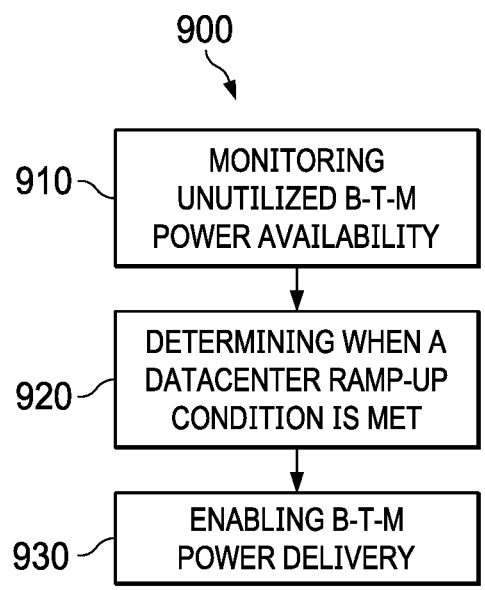
FIG. 9 shows a method of dynamic power delivery to a flexible growcenter using unutilized behind-the-meter power in accordance with one or more embodiments of the present invention.

FIG. 9 shows a method of dynamic power delivery to a flexible growcenter (200 of FIG. 2) using unutilized behind-the-meter power 900 in accordance with one or more embodiments of the present invention. In step 910, the growcenter control system (220 of FIG. 4), or the remote master control system (420 of FIG. 4), may monitor unutilized behind-the-meter power availability. In certain embodiments, monitoring may include receiving information or an operational directive from the local station control system (410 of FIG. 4) or the grid operator (440 of FIG. 4) corresponding to unutilized behind-the-meter power availability.

In step 920, the growcenter control system (220 of FIG. 4), or the remote master control system (420 of FIG. 4), may determine when a growcenter ramp-up condition is met. In certain embodiments, the growcenter ramp-up condition may be met when there is sufficient behind-the-meter power availability and there is no operational directive from the local station to go offline or reduce power. In step 930, the growcenter control system (220 of FIG. 4) may enable behind-the-meter power delivery to one or more components of the climate control system (e.g., 235, 240, and/or 245), the irrigation system (e.g., 252), and lighting system 265.

While operational, the growcenter control system (220 of FIG. 4), or the remote master control system (420 of FIG. 4), may receive an operational directive to modulate power consumption. In certain embodiments, the operational directive may be a directive to reduce power consumption. In such embodiments, the growcenter control system (220 of FIG. 4) or the remote master control system (420 of FIG. 4) may dynamically withdraw power delivery to one or more components of the climate control system (e.g., 235, 240, and/or 245), the irrigation system (e.g., 252), and lighting system 265 or subsets thereof or dynamically reduce power consumption of one or more components of the climate control system (e.g., 235, 240, and/or 245), the irrigation system (e.g., 252), and lighting system 265 or subsets thereof. In other embodiments, the operational directive may be a directive to provide a power factor correction factor. In such embodiments, the growcenter control system (220 of FIG. 4) or the remote master control system (420 of FIG. 4) may dynamically adjust power delivery to one or more components of the climate control system (e.g., 235, 240, and/or 245), the irrigation system (e.g., 252), and lighting system 265 to achieve a desired power factor correction factor. In still other embodiments, the operational directive may be a directive to go offline or power down. In such embodiments, the growcenter control system (220 of FIG. 4) may disable power delivery to one or more components of the climate control system (e.g., 235, 240, and/or 245), the irrigation system (e.g., 252), and lighting system 265.

The growcenter control system (220 of FIG. 4), or the remote master control system (420 of FIG. 4), may determine when a growcenter ramp-down condition is met. In certain embodiments, the growcenter ramp-down condition may be met if there is insufficient or anticipated to be insufficient behind-the-meter power availability or there is an operational directive from the local station to go offline or reduce power. The growcenter control system (220 of FIG. 4) may disable behind-the-meter power delivery to one or more components of the climate control system (e.g., 235, 240, and/or 245), the irrigation system (e.g., 252), and lighting system 265. Once ramped-down, the growcenter control system (220 of FIG. 4) remains powered and in communication with the remote master control system (420 of FIG. 4) so that it may dynamically power the flexible growcenter (200 of FIG. 2) when conditions change.

One of ordinary skill in the art will recognize that a growcenter control system (220 of FIG. 4) may dynamically modulate power delivery to one or more computing systems (100 of FIG. 2) of a flexible growcenter (200 of FIG. 2) based on unutilized behind-the-meter power availability or an operational directive. The flexible growcenter (200 of FIG. 2) may transition between a fully powered down state (while the growcenter control system remains powered), a fully powered up state, and various intermediate states in between. In addition, flexible growcenter (200 of FIG. 2) may have a blackout state, where all power consumption, including that of the growcenter control system (220 of FIG. 4) is halted. However, once the flexible growcenter (200 of FIG. 2) enters the blackout state, it will have to be manually rebooted to restore power to growcenter control system (220 of FIG. 4). Local station conditions or operational directives may cause flexible growcenter (200 of FIG. 2) to ramp-up, reduce power consumption, change power factor, or ramp-down.

Advantages of one or more embodiments of the present invention may include one or more of the following:

In one or more embodiments of the present invention, a method and system for dynamic power delivery to a flexible growcenter using unutilized energy sources provides a green solution to the problem of scalable container farming.

In one or more embodiments of the present invention, a method and system for dynamic power delivery to a flexible growcenter using unutilized energy sources allows for the rapid deployment of mobile growcenters to local stations. The mobile growcenters may be deployed on site, near the source of power generation, and receive unutilized behind-the-meter power when it is available.

In one or more embodiments of the present invention, a method and system for dynamic power delivery to a flexible growcenter using unutilized energy sources allows for the power delivery to the growcenter to be modulated based on conditions or an operational directive received from the local station or the grid operator.

In one or more embodiments of the present invention, a method and system for dynamic power delivery to a flexible growcenter using unutilized energy sources may dynamically adjust power consumption by ramping-up, ramping-down, or adjusting the power consumption of one or more computing systems within the flexible growcenter.

In one or more embodiments of the present invention, a method and system for dynamic power delivery to a flexible growcenter using unutilized energy sources may be powered by unutilized behind-the-meter power that is free from transmission and distribution costs. As such, the flexible growcenter may perform computational operations, such as hashing function operations, with little to no energy cost.

In one or more embodiments of the present invention, a method and system for dynamic power delivery to a flexible growcenter using unutilized energy sources provides a number of benefits to the hosting local station. The local station may use the flexible growcenter to adjust a load, provide a power factor correction, to offload power, or operate in a manner that invokes a production tax credit.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A flexible growcenter comprising:
a mobile container;
a behind-the-meter power input system comprises an input configured to receive behind-the-meter power from a grid scale power generation station prior to the power undergoing step-up transformation for transmission to an electrical grid, the behind-the-meter power input system disposed on an input side of a step-up transformer;
a power distribution system;
a growcenter control system;
a climate control system,
a lighting system; and
an irrigation system;
wherein the growcenter control system modulates power delivery to one or more components of the climate control system, the lighting system, and the irrigation system based on unutilized behind-the-meter power availability or an operational directive,
wherein the input of the behind-the-meter power input system is configured to receive three-phase behind-the-meter AC voltage and provide the three-phase behind-the-meter AC voltage to the power distribution system, and the input (i) further comprises a supervisory AC-to-AC step-down transformer configured to step down the three-phase behind-the-meter AC voltage to a single-phase supervisory nominal AC voltage or (ii) the input is further configured to receive single-phase supervisory nominal AC voltage from a local station or metered source.

2. The flexible growcenter of claim 1, further comprising: a remote master control system.

3. The flexible growcenter of claim 2, wherein the remote master control system dynamically adjusts power delivery to the flexible growcenter based on a remote master control directive.

4. The flexible growcenter of claim 1, wherein the behind-the-meter power input system provides the single-phase supervisory nominal AC voltage to the growcenter control system.

5. The flexible growcenter of claim 1, wherein input of the behind-the-meter power input system comprises is configured to receive three-phase behind-the-meter AC voltage and an operational AC-to-AC step-down transformer configured to controllably step down the three-phase behind-the-meter AC voltage to three-phase nominal AC voltage.

6. The flexible growcenter of claim 5, wherein the growcenter control system controllably enables or disables generation of the three-phase nominal AC voltage by the operational AC-to-AC step-down transformer.

7. The flexible growcenter of claim 5, wherein the three-phase behind-the-meter AC voltage comprises a three-phase wind-generated AC voltage output by one or more wind turbines prior to an AC-to-AC step-up transformer that steps up the three-phase wind-generated AC voltage to a three-phase grid AC voltage for delivery to the electrical grid.

8. The flexible growcenter of claim 5, wherein the three-phase behind-the-meter AC voltage comprises a three-phase solar-generated AC voltage output by a DC-to-AC inverter that inputs solar-generated DC voltage from one or more solar panels and prior to an AC-to-AC step-up transformer that steps up the three-phase solar-generated AC voltage to a three-phase grid AC voltage for delivery to the electrical grid.

9. The flexible growcenter of claim 5, wherein the three-phase behind-the-meter AC voltage comprises a three-phase gas-generated AC voltage output by a generator that inputs combustible gas diverted from a flare or venting system.

10. The flexible growcenter of claim 5, wherein the three-phase behind-the-meter AC voltage is a three-phase metered AC voltage.

11. The flexible growcenter of claim 5, further comprising a battery system configured to convert the three-phase AC voltage to DC nominal voltage and store power in a plurality of storage cells.

12. The flexible growcenter of claim 1, wherein the power distribution system controllably provides a single phase of the three-phase AC voltage to the one or more components of the climate control system, the irrigation system, and the lighting system.

13. The flexible data center of claim 1, wherein the growcenter control system controllably selects which phase of the three-phase AC voltage the power distribution system provides to each components of the climate control system, the irrigation system, and the lighting system.

14. The flexible growcenter of claim 1, wherein the growcenter control system modulates a power factor correction factor by controllably adjusting which phase of the three-phase AC voltage each component of the climate control system, the irrigation system, and the lighting system receive.

15. The flexible growcenter of claim 1, wherein the unutilized behind-the-meter power availability comprises one or more of excess local power generation at a local station level, excess local power generation that a grid cannot receive, local power generation subject to economic curtailment, local power generation subject to reliability curtailment, local power generation subject to power factor correction, low local power generation, start up local power generation situations, transient local power generation situations, or testing local power generation situations where there is an economic advantage to using local behind-the-meter power generation to power the flexible growcenter.

16. The flexible growcenter of claim 1, wherein the operational directive comprises one or more of a local station directive, a remote master control directive, or a grid directive.

17. The flexible growcenter of claim 1, wherein the operational directive comprises one or more of a dispatchability directive or a forecast directive.

18. The flexible growcenter of claim 1, wherein the operational directive comprises a workload directive based on actual behind-the-meter power availability or projected behind-the-meter power availability.

19. The flexible growcenter of claim 1, wherein the climate control system comprises a humidity control system, a gas system, and an air conditioner/heater.

20. The flexible growcenter of claim 1, wherein the irrigation system comprises a water tank, a pump system, and a plurality of irrigation lines.

21. The flexible growcenter of claim 1, wherein the lighting system comprises a plurality of lights.

22. The flexible growcenter of claim 1, wherein the mobile container comprises a storage container configured for placement on a ground surface.

23. The flexible growcenter of claim 11, wherein the DC nominal voltage from the plurality of storage cells are converted via a DC-to-AC inverter to three-phase AC voltage for flexible growcenter use.

24. The flexible growcenter of claim 1, wherein the mobile container comprises a storage trailer on wheels.

25. A method of dynamic power delivery to a flexible growcenter using unutilized behind-the-meter power comprising:
monitoring unutilized behind-the-meter power availability within a behind-the-meter power input system, wherein the behind the meter power input system comprises an input configured to receive behind-the-meter power from a grid scale power generation station prior to the power undergoing step-up transformation for transmission to an electrical grid, the behind-the-meter power input system disposed on an input side of a step-up transformer;
determining when a growcenter ramp-up condition is met, the growcenter ramp-up condition is met if there is sufficient behind-the-meter power availability and there is no operational directive from a local station, a remote master control system, or a grid operator to go offline; and
enabling behind-the-meter power delivery to one or more components of a climate control system, a lighting system, and an irrigation system when the growcenter ramp-up condition is met,
wherein the input of the behind-the-meter power input system is configured to receive three-phase behind-the-meter AC voltage and provide the three-phase behind-the-meter AC voltage to the power distribution system, and (i) the input of the behind-the-meter power input system comprises a supervisory AC-to-AC step-down transformer configured to step down the three-phase behind-the-meter AC voltage to a single-phase supervisory nominal AC voltage or (ii) the input is further configured to receive single-phase supervisory nominal AC voltage from a local station or metered source.

26. The method of claim 25, further comprising:
determining when a growcenter ramp-down condition is met; and
disabling power delivery to the one or more components of the climate control system, the irrigation system, and the lighting system when the growcenter ramp-down condition is met.

27. The method of claim 25, further comprising:
receiving an operational directive to go offline; and
disabling power delivery to the climate control system, the irrigation system, and the lighting system.

28. The method of claim 25, further comprising:
receiving an operational directive to reduce power consumption; and
dynamically reducing power delivery to a subset of the one or more components of the climate control system, the irrigation system, and the lighting system.

29. The method of claim 25, further comprising:
receiving an operational directive to reduce power consumption; and dynamically reducing power consumption to the one or more components of the climate control system, the irrigation system, and the lighting system.

30. The method of claim 25, further comprising:
receiving an operational directive to provide power factor correction; and
dynamically adjusting power delivery to a subset of the one or more components of the climate control system, the irrigation system, and the lighting system.

31. The method of claim 25, wherein the unutilized behind-the-meter power availability comprises one or more of excess local power generation at a local station level, excess local power generation that a grid cannot receive, local power generation subject to economic curtailment, local power generation subject to reliability curtailment, local power generation subject to power factor correction, low local power generation, start up local power generation situations, transient local power generation situations, or testing local power generation situations where there is an economic advantage to using local behind-the-meter power generation.

32. The method of claim 26, wherein the growcenter ramp-down condition is met if there is insufficient behind-the-meter power availability or there is an operational directive from a local station to go offline.

* * * * *